United States Patent
Linzer

(10) Patent No.: US 11,574,484 B1
(45) Date of Patent: Feb. 7, 2023

(54) HIGH RESOLUTION INFRARED IMAGE GENERATION USING IMAGE DATA FROM AN RGB-IR SENSOR AND VISIBLE LIGHT INTERPOLATION

(71) Applicant: Ambarella International LP, Santa Clara, CA (US)

(72) Inventor: Elliot N. Linzer, Bergenfield, NY (US)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 17/148,143

(22) Filed: Jan. 13, 2021

(51) Int. Cl.
| | | |
|---|---|---|
| G06V 20/59 | (2022.01) | |
| H04N 5/33 | (2006.01) | |
| G06T 7/521 | (2017.01) | |
| H04N 13/239 | (2018.01) | |
| H04N 13/178 | (2018.01) | |
| G06V 40/16 | (2022.01) | |

(52) U.S. Cl.
CPC ............ *G06V 20/597* (2022.01); *G06T 7/521* (2017.01); *G06V 40/161* (2022.01); *G06V 40/168* (2022.01); *G06V 40/172* (2022.01); *H04N 5/332* (2013.01); *H04N 13/178* (2018.05); *H04N 13/239* (2018.05); *G06T 2207/10024* (2013.01); *G06T 2207/10028* (2013.01); *G06T 2207/10048* (2013.01); *G06T 2207/20084* (2013.01)

(58) Field of Classification Search
CPC .............. G06K 9/00845; G06T 7/521; G06T 2207/10024; G06T 2207/10028; G06T 2207/10048
See application file for complete search history.

(56) References Cited

U.S. PATENT DOCUMENTS

| | | | |
|---|---|---|---|
| 9,191,643 B2 * | 11/2015 | Sweeney | G06T 7/593 |
| 10,275,855 B2 * | 4/2019 | Price | H04N 5/332 |
| 10,579,875 B2 * | 3/2020 | Dal Mutto | G06T 7/285 |
| 10,893,248 B2 * | 1/2021 | Otsubo | H04N 5/33 |
| 11,046,327 B2 * | 6/2021 | Stec | B60R 11/04 |
| 2013/0188057 A1 * | 7/2013 | Lin | H04N 5/332 |
| | | | 348/164 |
| 2013/0229526 A1 * | 9/2013 | Matsuno | H04N 9/04559 |
| | | | 348/164 |
| 2014/0307952 A1 * | 10/2014 | Sweeney | G06T 7/593 |
| | | | 382/154 |
| 2017/0134704 A1 * | 5/2017 | Otsubo | H04N 5/33 |
| 2017/0374299 A1 * | 12/2017 | Liu | H04N 1/60 |
| 2018/0197275 A1 * | 7/2018 | Price | H04N 9/04515 |
| 2019/0108396 A1 * | 4/2019 | Dal Mutto | G06K 9/6267 |

(Continued)

*Primary Examiner* — Boubacar Abdou Tchoussou
(74) *Attorney, Agent, or Firm* — Christopher P. Maiorana, PC

(57) ABSTRACT

An apparatus includes a memory and a processor circuit. The memory may be configured to store one or more frames of image pixel data. Each of the frames generally comprises red (R) samples, green (G) samples, blue (B) samples, and infrared (IR) samples. The processor circuit may be configured to generate an infrared image for each frame. The infrared image generally has a number of infrared (IR) pixels greater than the number of the infrared (IR) samples of each frame. The processor circuit generally performs interpolation utilizing the infrared (IR) samples and one or more of the red (R) samples, the green (G) samples, and the blue (B) samples of each frame in generating the infrared image for each frame.

20 Claims, 10 Drawing Sheets

(56) References Cited

U.S. PATENT DOCUMENTS

| | | | | |
|---|---|---|---|---|
| 2020/0324780 A1* | 10/2020 | Stec | .................. | B60Q 3/18 |
| 2021/0133469 A1* | 5/2021 | Wang | .................. | G08B 21/18 |
| 2021/0185285 A1* | 6/2021 | Sun | .................. | H04N 1/60 |

* cited by examiner

HIGH RESOLUTION INFRARED IMAGE GENERATION USING IMAGE DATA FROM AN RGB-IR SENSOR AND VISIBLE LIGHT INTERPOLATION

FIELD OF THE INVENTION

The invention relates to digital cameras generally and, more particularly, to a method and/or apparatus for implementing high resolution infrared image generation using image data from an RGB-IR sensor and visible light interpolation.

BACKGROUND

Infrared (IR) radiation, sometimes called infrared light, is electromagnetic radiation with wavelengths longer than those of visible light. IR radiation is generally invisible to the human eye. Near infrared (NIR) radiation generally refers to IR radiation with wavelengths in a range of 750 nm-1400 nm. A pixel array in an RGB-IR sensor is a repeating pattern of red, green, blue and IR pixels. For example, the following 4×4 pattern is generally repeated across the sensor:

| R | G  | B | G  |
|---|----|---|----|
| G | IR | G | IR |
| B | G  | R | G  |
| G | IR | G | IR |

The "R", "G", "B", and "IR" labels represent red, green, blue, and infrared pixels, respectively. However, a more precise definition is that each of the red/green/blue pixels detect red+IR, green+IR, and blue+IR, respectively, whereas the IR pixels detect only IR. Thus, all pixels of the RGB-IR sensor detect IR, with the red, green, and blue pixels also detecting red, green, and blue visible light, respectively. When a pixel detects, for example, red+IR, the pixel value is equal to the sum of the red light and the IR radiation incident on the pixel. Thus, the pixel value by itself cannot be used to determine the amount of red light or the amount of IR radiation at that location.

One application for RGB/IR sensors is night vision. An IR emitter is used to shine IR radiation onto some area covered by a camera with an RGB/IR sensor. Human vision cannot detect this radiation, so the area appears dark. However, the sensor can still "see" the scene because the sensor is sensitive to IR radiation. The IR image does not have any color information, and so the IR image will be monochrome (black and white). When an RGB-IR camera is operating in good visible light (e.g., daytime), the RGB-IR sensor also senses the visible light in the RGB pixels. For some camera systems, an IR-Only output is not needed. In these systems, when there is good light the camera will try to recover the underlying RGB signal. In poor light (e.g., dark conditions) the camera will keep a mix of all radiation—visible light and IR radiation—to produce a viewable low color image. For other camera systems, an IR-Only output is needed. Standard industry practice when an IR-Only output is needed is to simply take the IR pixels and ignore the RGB pixels, yielding a picture ½×½ the sensor resolution.

It would be desirable to implement an apparatus and/or method for outputting a high resolution infrared image generated using image data from an RGB-IR sensor and visible light interpolation.

SUMMARY

The invention concerns an apparatus comprising a memory and a processor circuit. The memory may be configured to store one or more frames of image pixel data. Each of the frames generally comprises red (R) samples, green (G) samples, blue (B) samples, and infrared (IR) samples. The processor circuit may be configured to generate an infrared image for each frame. The infrared image for each frame generally has a number of infrared (IR) pixels greater than the number of the infrared (IR) samples of each frame. The processor circuit generally performs interpolation utilizing the infrared (IR) samples and one or more of the red (R) samples, the green (G) samples, and the blue (B) samples of each frame in generating the infrared image for each frame.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
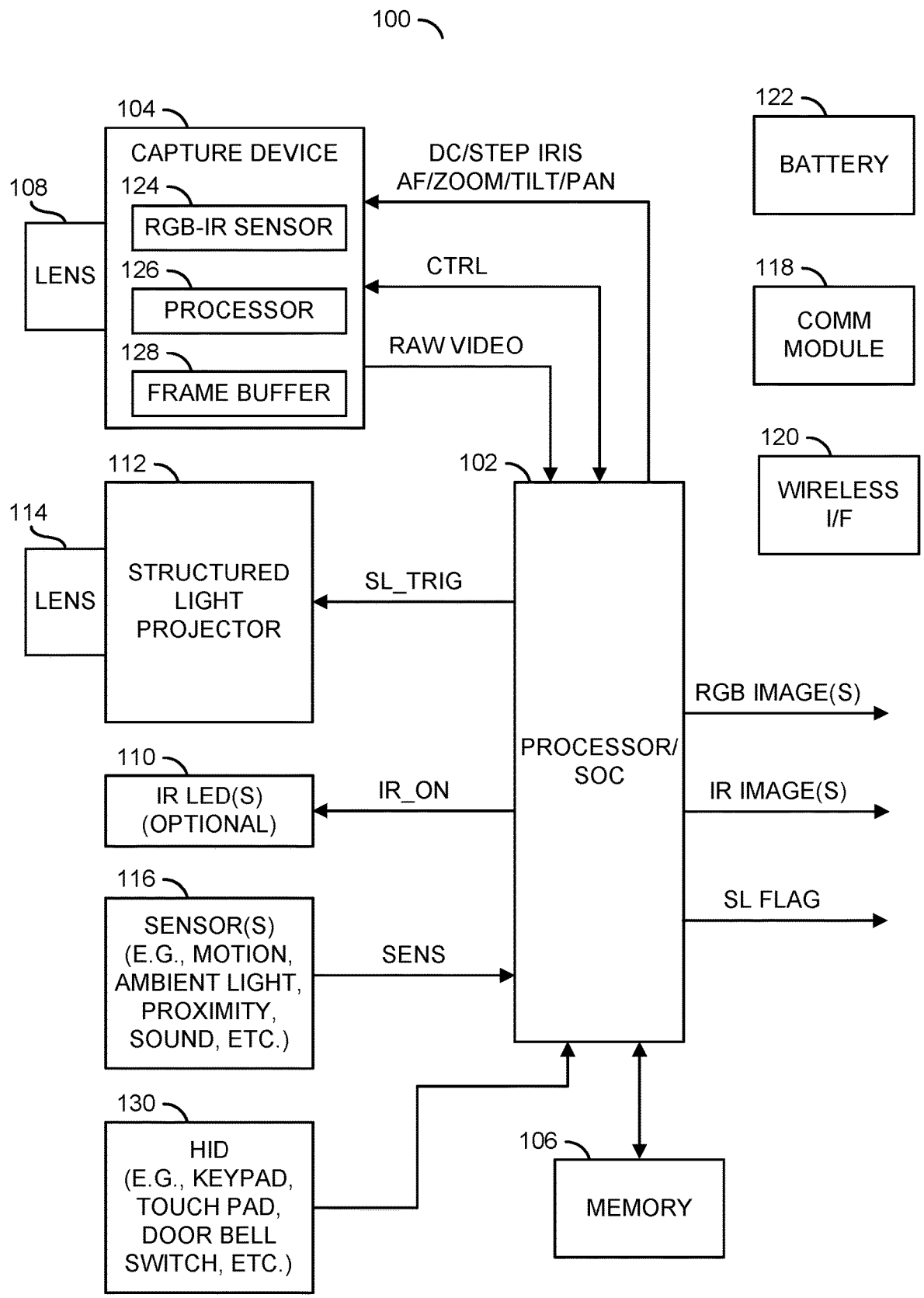
FIG. 1 is a diagram illustrating components of a camera in accordance with example embodiments of the invention.

Embodiments of the present invention include providing high resolution infrared images generated using image data from an RGB-IR sensor and visible light interpolation that may (i) utilize some or all of the pixels of an RGB-IR sensor to generate an infrared image having a pixel resolution greater than the total number of infrared (IR) pixels of the RGB-IR sensor, (ii) utilize the infrared image data as input to one or more video analytics techniques, (iii) generate each pixel of the infrared image by utilizing red, green, blue, and infrared pixels of the RGB-IR sensor corresponding to each pixel location of the infrared image, (iv) provide a high resolution infrared image containing a structured light pattern for 3D face recognition, (v) provide a high resolution infrared image containing a structured light pattern for stereo imaging, (vi) provide a high resolution infrared image for improved driver monitoring for signs of fatigue, even when a driver is wearing sunglasses, and/or (vii) be implemented as one or more integrated circuits.

In one application, a camera system with stereo capabilities (e.g., using two cameras) may be implemented to detect depth. Depth may be detected by looking at the correspondence between left and right images. If part of a scene is flat (e.g., a wall), finding the correct offset to match the left and right images may be difficult. By projecting an infrared (IR) structured light pattern, the IR structured light pattern itself may be matched up. Having a high resolution IR image may improve matching performance (e.g., by avoiding aliasing, etc.).

In a second application, face identification (e.g., identifying an individual from his or her face) may be implemented. The way a projected IR structured light pattern "bends" across the 3D surface of a shape may be used (in addition to the RGB-IR data) to identify a "real" face versus a fake face (e.g., a photograph, computer display, etc.). When such systems are used for access control, using the 3D information may defeat attempts to fool the system by using a photograph of a person who should have access. Having a high resolution IR image available to analyze may improve an identification sensitivity of an access control system.

In a third application, a driver monitoring system may be implemented. The color (e.g., RGB or YUV) image data may be used with standard computer vision techniques to notice signs of fatigue in the driver. However, the eyes of the driver may not be visible if he or she is wearing sunglasses. An IR emitter may be aimed at the driver and the IR signal, which is not blocked by sunglasses nor visible to the driver, may be used to monitor the eyes of the driver (e.g., for indication of fatigue, etc.). Having a high resolution IR image available to analyze may improve a detection sensitivity of the monitoring system.

In general, utilizing high or full resolution IR images for all of the above cases generally provides improved performance over the conventional method of just taking the IR pixels and outputting a ½×½ sized IR picture. In various embodiments, red, green, blue, and infrared samples may be utilized in generating images with high and/or full pixel resolutions. As used herein, a pixel is the smallest addressable image element. In general, pixel values may comprise one or more samples (or components or sample values) depending on a particular type of image containing the pixels. In one example, each pixel of an RGB color image (or frame) generally comprises three components or sample values, a red sample, a green sample, and a blue sample. In another example, each pixel of an YUV or YCbCr color image (or frame) generally comprises three components or sample values: a Y sample, a U or Cb sample, and a V or Cr sample. In general, each pixel of an RGB-IR sensor comprises only one sample, either a red sample, a blue sample, a green sample, or an IR sample. The number of red, green, blue, and IR samples may vary depending on what type of color filter array (CFA) is used. In the example of the 4×4 pattern above, each pixel comprises a single sample and together the sixteen pixels comprise 8 green samples, 4 IR samples, 2 red samples, and 2 blue samples. In an example of an IR image (or frame), each pixel generally comprises only one sample, an IR sample value. Similarly, each pixel of a monochrome image (or frame) generally comprises only one sample, an intensity (e.g., luminance or Y) sample value.

Referring to FIG. 1, a block diagram of a camera 100 is shown illustrating an example implementation. In an example, the camera 100 may comprise a block (or circuit) 102, a block (or circuit) 104, a block (or circuit) 106, a block (or circuit) 108, a block (or circuit) 110, a block (or circuit) 112, a block (or circuit) 114, a block (or circuit) 116, a block (or circuit) 118, and/or a block (or circuit) 120. The circuit 102 may be implemented as a processor and/or System on Chip (SoC). The circuit 104 may be implemented as a capture device. The circuit 106 may be implemented as a memory. The block 108 may be implemented as an optical lens. The circuit 110 may be implemented as one or more infrared (IR) light emitting diodes (LEDs). The circuit 112 may be implemented as a structured light projector. The block 114 may be implemented as a structured light pattern lens. The circuit 116 may be implemented as one or more sensors. The circuit 118 may be implemented as a communication device. The circuit 120 may be implemented as a wireless interface. The circuit 122 may be implemented as a battery.

In some embodiments, the camera 100 may comprise the processor/SoC 102, one or more of the capture device 104, the memory 106, one or more of the lens 108, the IR LED(s) 110, the IR structured light projector 112, the lens 114, the sensors 116, the communication module 118, the wireless interface 120, and the battery 122. In another example, the camera 100 may comprise the capture device 104, the lens 108, the IR LED(s) 110, the IR structured light projector 112, the lens 114, and the sensors 116, and the processor/SoC 102, the memory 106, the communication module 118, the wireless interface 120, and the battery 122 may be components of a separate device. The implementation of the camera 100 may be varied according to the design criteria of a particular implementation.

The lens 108 may be attached to the capture device 104. In an example, more than one instance of the capture device 104 and the lens 108 may be implemented. In an example where stereo imaging is to be performed, a first instance of the capture device 104 attached to a first instance of the lens 108 and a second instance of the capture device 104 attached to a second instance of lens 108 may be implemented. The processor 102 may be configured to connect to a plurality of capture devices and associated lenses. In an example, the capture device 104 may comprise a block (or circuit) 124, a block (or circuit) 126, and a block (or circuit) 128. The circuit 124 may implement an image sensor. In an example, the image sensor of the circuit 124 may be an RGB-IR image sensor. The circuit 126 may implement as a processor and/or logic. The circuit 128 may be a memory circuit (e.g., a frame buffer).

The capture device 104 may be configured to capture video image data (e.g., light collected and focused by the lens 108). The capture device 104 may capture data received through the lens 108 to generate a video bitstream (e.g., a sequence of video frames). In various embodiments, the lens 108 may be implemented as a fixed focus lens. A fixed focus lens generally facilitates smaller size and low power. In an example, a fixed focus lens may be used in battery powered, doorbell, and other low power camera applications. In some embodiments, the lens 108 may be directed, tilted, panned, zoomed and/or rotated to capture the environment surrounding the camera 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 124 may perform a photoelectric conversion of the light received by the lens 108. The processor/logic 126 may transform the digital data stream into a video data stream (or bitstream), a video file, and/or a number of video frames. In an example, the capture device 104 may present the video data as a digital video signal (e.g., RAW VIDEO). The digital video signal may comprise the video frames (e.g., sequential digital images and/or audio).

The video data captured by the capture device 104 may be represented as a signal/bitstream/data communicated by the digital video signal RAW VIDEO. The capture device 104 may present the signal RAW VIDEO to the processor/SoC 102. The signal RAW VIDEO may represent the video frames/video data. The signal RAW VIDEO may be a video stream captured by the capture device 104.

The image sensor 124 may receive light from the lens 108 and transform the light into digital data (e.g., the bitstream). For example, the image sensor 124 may perform a photoelectric conversion of the light from the lens 108. In some embodiments, the image sensor 124 may have extra margins that are not used as part of the image output. In some embodiments, the image sensor 124 may not have extra margins. In various embodiments, the image sensor 124 may be configured to generate an RGB-IR video signal. In an infrared (IR) radiation only illuminated field of view, the image sensor 124 may generate a monochrome (B/W) video signal. In a field of view illuminated by both IR radiation and visible light, the image sensor 124 may be configured to generate color information in addition to the monochrome video signal. In various embodiments, the image sensor 124 may be configured to generate a video signal in response to visible light and/or infrared (IR) radiation.

The processor/logic 126 may transform the bitstream into a human viewable content (e.g., video data that may be understandable to an average person regardless of image quality, such as the video frames). For example, the processor/logic 126 may receive pure (e.g., raw) data from the image sensor 124 and generate (e.g., encode) video data (e.g., the bitstream) based on the raw data. The capture device 104 may have the memory 128 to store the raw data and/or the processed bitstream. For example, the capture device 104 may implement the frame memory and/or buffer 128 to store (e.g., provide temporary storage and/or cache) one or more of the video frames (e.g., the digital video signal). In some embodiments, the processor/logic 126 may perform analysis and/or correction on the video frames stored in the memory/buffer 128 of the capture device 104.

The sensors 116 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 116 may be configured to detect motion anywhere in the field of view monitored by the camera 100. In various embodiments, the detection of motion may be used as one threshold for activating the capture device 104. The sensors 116 may be implemented as an internal component of the camera 100 and/or as a component external to the camera 100. In an example, the sensors 116 may be implemented as a passive infrared (PIR) sensor. In another example, the sensors 116 may be implemented as a smart motion sensor. In embodiments implementing the smart motion sensor, the sensors 116 may comprise a low resolution image sensor configured to detect motion and/or persons.

In various embodiments, the sensors 116 may generate a signal (e.g., SENS). The signal SENS may comprise a variety of data (or information) collected by the sensors 116. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 116 may generate (assert) the signal SENS when motion is detected in the field of view monitored by the camera 100. In another example, the sensors 116 may generate (assert) the signal SENS when triggered by audio in the field of view monitored by the camera 100. In still another example, the sensors 116 may be configured to provide directional information with respect to motion and/or sound detected in the field of view. The directional information may also be communicated to the processor/SoC 102 via the signal SENS.

The processor/SoC 102 may be configured to execute computer readable code and/or process information. In various embodiments, the computer readable code may be stored within the processor/SoC 102 (e.g., microcode, etc.) and/or in the memory 106. In an example, the processor/SoC 102 may be configured to execute one or more artificial neural network models (e.g., facial recognition CNN, object detection CNN, object classification CNN, etc.) stored in the memory 106. In an example, the memory 106 may store one or more directed acyclic graphs (DAGs) and one or more sets of weights defining the one or more artificial neural network models. The processor/SoC 102 may be configured to receive input from and/or present output to the memory 106. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The processor/SoC 102 may receive the signal RAW VIDEO and the signal SENS. In an example, the processor/SoC 102 may generate one or more video output signals (e.g., RGB, IR, etc.) and one or more control signals (e.g., SL FLAG) based on the signal RAW VIDEO, the signal SENS, and/or other input. In some embodiments, the signals RGB, IR, and SL FLAG may be generated based on analysis of the signal RAW VIDEO and/or objects detected in the signal RAW VIDEO. In an example, the signal RGB generally comprises full resolution color images (frames) in either an RGB or YUV color space. In an example, the signal RGB may be generated when the processor/SoC 102 is operating in a day mode. In an example, the signal IR generally comprises monochrome IR images (frames). In one example, the signal IR may comprise high resolution images having a pixel resolution greater than a number of IR samples of the RGB-IR sensor 124. In another example, the signal IR may comprise full resolution images having a pixel resolution matching a total number of samples of the RGB-IR sensor 124. In one example, the signal IR may comprise IR images using ambient IR radiation when the processor/SoC 102 is operating in a day mode. In another example, the signal IR may comprise IR images using IR LED illumination when the processor/SoC 102 is operating in a night mode. In an example, the signal IR may comprise IR images with no structured light pattern in either the day mode or the night mode. In yet another example, the signal IR may comprise IR images containing a structured light pattern in at least a portion of the image when the IR projector is turned on and the processor/SoC 102 is operating in either the day mode or night mode. In various embodiments, the processor/SoC 102 may be configured to perform one or more of depth determination, feature extraction, object detection, object tracking, object identification, face detection, and facial recognition. For example, the processor/SoC 102 may determine motion information and/or depth information by analyzing a frame from the signal RAW VIDEO and comparing the frame to a previous frame. The comparison may be used to perform digital motion estimation. In some embodiments, the processor/SoC 102 may be configured to generate the video output signals RGB and IR comprising video data from the signal RAW VIDEO. The video output signals RGB and IR may be presented to the memory 106, the communications module 118, and/or the wireless interface 120. The signal SL FLAG may be configured to indicate when the structured light pattern is present in the signals RGB and IR. In an example, the image data carried by the signal RGB may be ignored (dropped) when the signal indicates the structured light pattern is present.

The memory 106 may store data. In an example, the memory 106 may be configured to store image pixel data (e.g., red (R) samples, green (G) samples, blue (B) samples, and infrared (IR) samples) for a number of frames. The memory 106 may implement various types of memory including, but not limited to, a cache, flash memory, memory card, random access memory (RAM), dynamic RAM (DRAM) memory, etc. The type and/or size of the memory 106 may be varied according to the design criteria of a particular implementation. The data stored in the memory 106 may correspond to a video file, motion information (e.g., readings from the sensors 116), video fusion parameters, image stabilization parameters, user inputs, computer vision models, and/or metadata information.

The lens 108 (e.g., camera lens) may be directed to provide a view of an environment surrounding the camera 100. The lens 108 may be aimed to capture environmental data (e.g., light). The lens 108 may be wide-angle lenses and/or fish-eye lenses (e.g., lenses capable of capturing a wide field of view). The lens 108 may be configured to capture and/or focus the light for the capture device 104. Generally, the image sensor 124 is located behind the lens 108. Based on the captured light from the lens 108, the capture device 104 may generate a bitstream and/or video data.

The communications module 118 may be configured to implement one or more communications protocols. For example, the communications module 118 and the wireless interface 120 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the wireless interface 120 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera 100 is implemented as a wireless camera, the protocol implemented by the communications module 118 and wireless interface 120 may be a wireless communications protocol. The type of communications protocols implemented by the communications module 118 may be varied according to the design criteria of a particular implementation.

The communications module 118 and/or the wireless interface 120 may be configured to generate a broadcast signal as an output from the camera 100. The broadcast signal may send the video data RGB and/or IR, and/or the control signal SL FLAG to external devices. For example, the broadcast signal may be sent to a cloud storage service (e.g., a storage service capable of scaling on demand). In some embodiments, the communications module 118 may not transmit data until the processor/SoC 102 has performed video analytics to determine that an object is in the field of view of the camera 100.

In some embodiments, the communications module 118 may be configured to generate a manual control signal. The manual control signal may be generated in response to a signal from a user received by the communications module 118. The manual control signal may be configured to activate the processor/SoC 102. The processor/SoC 102 may be activated in response to the manual control signal regardless of the power state of the camera 100.

In some embodiments, the camera 100 may include a battery 122 configured to provide power for the various components of the camera 100. The multi-step approach to activating and/or disabling the capture device 104 based on the output of the motion sensor 116 and/or any other power consuming features of the camera 100 may be implemented to reduce a power consumption of the camera 100 and extend an operational lifetime of the battery 122. A motion sensor of the sensors 116 may have a very low drain on the battery 122 (e.g., less than 10 µW). In an example, the motion sensor of the sensors 116 may be configured to remain on (e.g., always active) unless disabled in response to feedback from the processor/SoC 102. The video analytics performed by the processor/SoC 102 may have a large drain on the battery 122 (e.g., greater than the motion sensor 116). In an example, the processor/SoC 102 may be in a low-power state (or power-down) until some motion is detected by the motion sensor of the sensors 116.

The camera 100 may be configured to operate using various power states. For example, in the power-down state (e.g., a sleep state, a low-power state) the motion sensor of the sensors 116 and the processor/SoC 102 may be on and other components of the camera 100 (e.g., the image capture device 104, the memory 106, the communications module 118, etc.) may be off. In another example, the camera 100 may operate in an intermediate state. In the intermediate state, the image capture device 104 may be on and the memory 106 and/or the communications module 118 may be off. In yet another example, the camera 100 may operate in a power-on (or high power) state. In the power-on state, the sensors 116, the processor/SoC 102, the capture device 104, the memory 106, and/or the communications module 118 may be on. The camera 100 may consume some power from the battery 122 in the power-down state (e.g., a relatively small and/or minimal amount of power). The camera 100 may consume more power from the battery 122 in the power-on state. The number of power states and/or the components of the camera 100 that are on while the camera 100 operates in each of the power states may be varied according to the design criteria of a particular implementation.

In some embodiments, the camera 100 may include a keypad, a touch pad (or screen), a doorbell switch, and/or other human interface devices (HIDs) 130. In an example, the sensors 116 may be configured to determine when an object is in proximity to the HIDs 130. In an example where the camera 100 is implemented as part of an access control application, the capture device 104 may be turned on to provide images for identifying a person attempting access, and illumination of a lock area, and/or for an access touch pad may be turned on.

In various embodiments, a low cost 3D sensing platform may be provided. The low cost 3D sensing platform may facilitate development of intelligent access control systems and smart security products such as smart video doorbells and door locks, payment systems, alarm systems, etc. In various embodiments, the low cost 3D sensing platform may include a vision system on chip (SoC), structured light projector, and RGB-IR image sensor. In various embodiments, an RGB-IR CMOS image sensor may be utilized to obtain both a visible light image and an infrared (IR) image, for viewing and facial recognition, and also utilize the infrared (IR) image for depth sensing. In an example, the vision SoC may provide depth processing, anti-spoofing algorithms, 3D facial recognition algorithms, and video encoding on a single chip.

In various applications, the low cost 3D sensing platform in accordance with embodiments of the invention may significantly reduce system complexity while improving performance, reliability, and security. In an example, the vision SoC in accordance with embodiments of the invention may include, but is not limited to, a powerful image signal processor (ISP), native support for RGB-IR color filter arrays, and advance high dynamic range (HDR) processing, which may result in exceptional image quality in low-light and high-contrast environments. In an example, the vision SoC in accordance with embodiments of the invention may provide an architecture that delivers computational power for liveness detection and 3D facial recognition, while running multiple artificial intelligence (AI) algorithms for advanced features such as people counting and anti-tailgating.

In various embodiments, system cost may be reduced by using an RGB-IR sensor (e.g., one sensor and one lens versus two sensors and two lenses). In some embodiments, system cost may be further reduced by using an RGB-IR rolling shutter sensor (e.g., rolling shutter vs. global shutter). By controlling the structured light projector through software, the time sequence may be adjusted easily, providing improved flexibility. Power savings may be realized because the structured light projector may be used briefly by the software.

In various embodiments, a low cost structured light based 3D sensing system may be implemented. In an example, the 3D information may be used for 3D modeling and liveness determination. In an example, the low cost structured light based 3D sensing system may be used to unlock a door, disarm an alarm system, and/or allow "tripwire" access to a restricted region (e.g., of the garden, the garage, the house, etc.). In one example, the low cost structured light based 3D sensing system may be configured to recognize gardener/pool maintenance person and inhibit triggering an alarm. In another example, the low cost structured light based 3D sensing system may be configured to limit access to certain times and days of the week. In another example, the low cost structured light based 3D sensing system may be configured to trigger an alarm upon recognition of certain objects (e.g. restraining order is out against ex-spouse, alert 911 if that person is detected). In another example, the low cost structured light based 3D sensing system may be configured to allow alarm system re-programming privilege based on video/audio identification (e.g., only person X or Y is permitted to change access level or policy, add users, etc. even if the correct password is entered).

Figure 2:
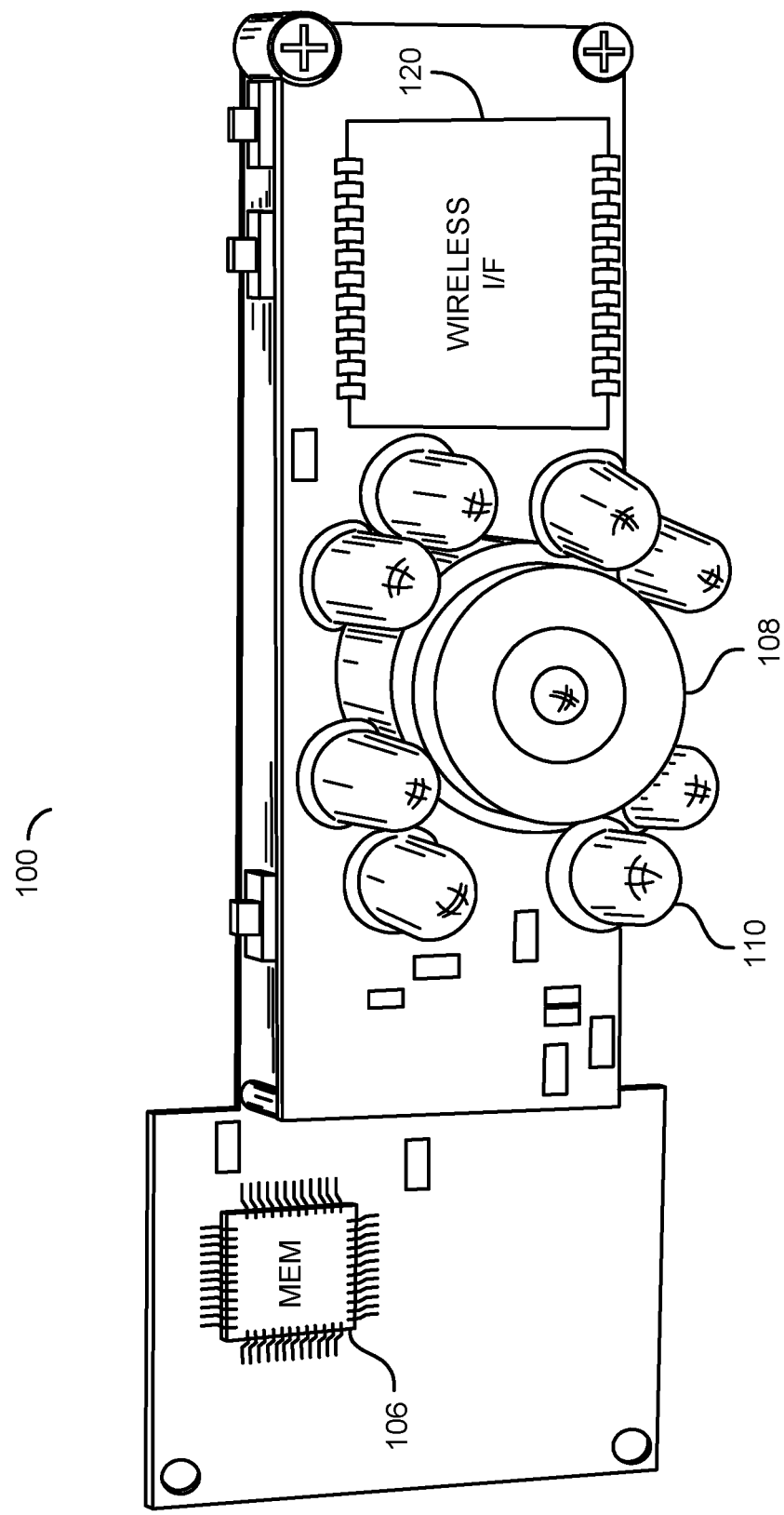
FIG. 2 is a diagram illustrating an example implementation of a camera in accordance with an example embodiment of the invention.

Referring to FIG. 2, a diagram is shown illustrating an example implementation of the camera 100 in accordance with an embodiment of the invention. In various embodiments, the camera 100 may comprise one or more circuit boards. In embodiments implementing more than one circuit board, the printed circuit boards may be mounted together. In an example, a first printed circuit board may include the lens(es) 108, a number of IR LEDs 110, and the wireless interface circuit (or module) 120, and a second printed circuit board may include the memory circuit (or chip) 106, the processor/SoC 102 and the RGB-IR image sensor 104 (obscured by the first printed circuit board). In one example, the wireless interface 120 may comprise a pre-certified wireless/cellular protocol module.

Figure 3:
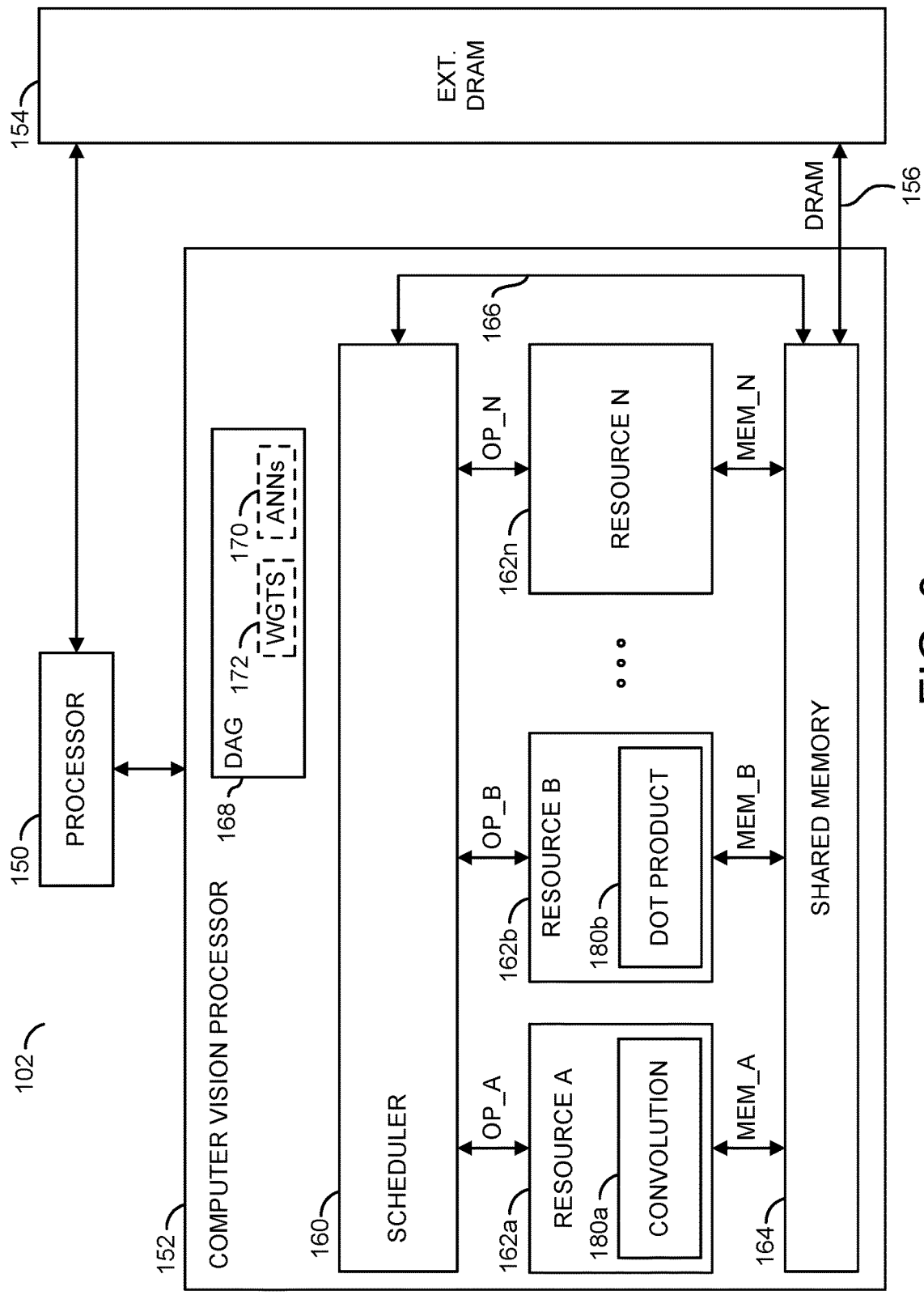
FIG. 3 is a diagram illustrating a processing circuit in which artificial neural networks may be run to apply artificial intelligence (AI) and computer vision (CV) techniques to high resolution IR images in accordance with example embodiments of the invention.

Referring to FIG. 3, a diagram is shown illustrating a processing circuit in which a full resolution IR image may be utilized in accordance with example embodiments of the invention. In an example, the processor/SoC 102 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processor/SoC 102 generally comprises hardware circuitry that is optimized to provide a high performance image processing and computer vision pipeline in minimal area and with minimal power consumption. In an example, various operations used to perform image processing, feature detection/extraction, and/or object detection/classification for computer (or machine) vision may be implemented using hardware modules designed to reduce computational complexity and use resources efficiently.

In an example embodiment, the processor/SoC 102 may comprise a block (or circuit) 150, a block (or circuit) 152, a block (or circuit) 154, and/or a memory bus 156. The circuit 150 may implement a first processor. The circuit 152 may implement a second processor. In an example, the circuit 152 may implement a computer vision processor. In an example, the processor 152 may be an intelligent vision processor. The circuit 154 may implement an external memory (e.g., a memory external to the circuits 150 and 152). In an example, the circuit 154 may be implemented as a dynamic random access memory (DRAM) circuit. The processor/SoC 102 may comprise other components (not shown). The number, type and/or arrangement of the components of the processor/SoC 102 may be varied according to the design criteria of a particular implementation.

The circuit 150 may implement a processor circuit. In some embodiments, the processor circuit 150 may be implemented using a general purpose processor circuit. The processor 150 may be operational to interact with the circuit 152 and the circuit 154 to perform various processing tasks. In an example, the processor 150 may be configured as a controller for the circuit 152. The processor 150 may be configured to execute computer readable instructions. In one example, the computer readable instructions may be stored by the circuit 154. In some embodiments, the computer readable instructions may comprise controller operations. The processor 150 may be configured to communicate with the circuit 152 and/or access results generated by components of the circuit 152. In an example, the processor 150 may be configured to utilize the circuit 152 to perform operations associated with one or more neural network models.

In an example, the processor 150 may be configured to program the circuit 152 with one or more pre-trained artificial neural network models (ANNs) 170 and weights/ kernels (WGTS) 172. In various embodiments, the ANNs 170 may be configured (trained) for operation in an edge device. In an example, the processing circuit 102 may be coupled to a sensor (e.g., video camera, etc.) configured to generate a data input. The processing circuit 102 may be configured to generate one or more outputs in response to the data input from the sensor based on one or more inferences made by executing the pre-trained ANNs 170 with the weights/kernels (WGTS) 172. The operations performed by the processor 150 may be varied according to the design criteria of a particular implementation.

In various embodiments, the circuit 154 may implement a dynamic random access memory (DRAM) circuit. The circuit 154 is generally operational to store multidimensional arrays of input data elements and various forms of output data elements. The circuit 154 may exchange the input data elements and the output data elements with the processor 150 and the processor 152.

The processor 152 may implement a computer vision processor circuit. In an example, the circuit 152 may be configured to implement various functionality used for computer vision. The processor 152 is generally operational to perform specific processing tasks as arranged by the processor 150. In various embodiments, all or portions of the processor 152 may be implemented solely in hardware. The processor 152 may directly execute a data flow directed to execution of the ANNs 170, and generated by software (e.g., a directed acyclic graph, etc.) that specifies processing (e.g., computer vision) tasks. In some embodiments, the processor 152 may be a representative example of numerous computer vision processors implemented by the processing circuit 102 and configured to operate together.

In an example, the processor 152 generally comprises a block (or circuit) 160, one or more blocks (or circuits) 162a-162n, a block (or circuit) 164, a path 166, and a block (or circuit) 168. The block 160 may implement a scheduler circuit. The blocks 162a-162n may implement hardware resources (or engines). The block 164 may implement a shared memory circuit. The block 168 may implement a directed acyclic graph (DAG) memory. In an example embodiment, one or more of the circuits 162a-162n may comprise blocks (or circuits) 180a-180n. In the example shown, circuits 180a and 180b are implemented.

In an example, the circuit 180a may implement convolution operations. In another example, the circuit 180b may be configured to provide dot product operations. The convolution and dot product operations may be used to perform computer (or machine) vision tasks (e.g., as part of an object detection process, etc.). In yet another example, one or more of the circuits 162c-162n may comprise blocks (or circuits) 180c-180n (not shown) to provide convolution calculations in multiple dimensions.

In an example, the circuit 152 may be configured to receive directed acyclic graphs (DAGs) from the processor 150. The DAGs received from the processor 150 may be stored in the DAG memory 168. The circuit 152 may be configured to execute a DAG for one of the ANNs 170 using the circuits 160, 162a-162n, and 164.

Multiple signals (e.g., OP_A to OP_N) may be exchanged between the circuit 160 and the respective circuits 162a-162n. Each signal OP_A to OP_N may convey execution operation information and/or yield operation information. Multiple signals (e.g., MEM_A to MEM_N) may be exchanged between the respective circuits 162a-162n and the circuit 164. The signals MEM_A to MEM_N may carry data. A signal (e.g., DRAM) may be exchanged between the circuit 154 and the circuit 164. The signal DRAM may transfer data between the circuits 154 and 160 (e.g., on the memory bus 166).

The circuit 160 may implement a scheduler circuit. The scheduler circuit 160 is generally operational to schedule tasks among the circuits 162a-162n to perform a variety of computer vision related tasks as defined by the processor 150. Individual tasks may be allocated by the scheduler circuit 160 to the circuits 162a-162n. The scheduler circuit 160 may allocate the individual tasks in response to parsing the directed acyclic graphs (DAGs) provided by the processor 150. The scheduler circuit 160 may time multiplex the tasks to the circuits 162a-162n based on the availability of the circuits 162a-162n to perform the work.

Each circuit 162a-162n may implement a processing resource (or hardware engine). The hardware engines 162a-162n are generally operational to perform specific processing tasks. The hardware engines 162a-162n may be implemented to include dedicated hardware circuits that are optimized for high-performance and low power consumption while performing the specific processing tasks. In some configurations, the hardware engines 162a-162n may operate in parallel and independent of each other. In other configurations, the hardware engines 162a-162n may operate collectively among each other to perform allocated tasks.

The hardware engines 162a-162n may be homogenous processing resources (e.g., all circuits 162a-162n may have the same capabilities) or heterogeneous processing resources (e.g., two or more circuits 162a-162n may have different capabilities). The hardware engines 162a-162n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In various embodiments, the hardware engines 162a-162n may be implemented solely as hardware circuits. In some embodiments, the hardware engines 162a-162n may be implemented as generic engines that may be configured through circuit customization and/or software/firmware to operate as special purpose machines (or engines). In some embodiments, the hardware engines 162a-162n may instead be implemented as one or more instances or threads of program code executed on the processor 150 and/or one or more processors 152, including, but not limited to, a vector processor, a central processing unit (CPU), a digital signal processor (DSP), or a graphics processing unit (GPU). In some embodiments, one or more of the hardware engines 162a-162n may be selected for a particular process and/or thread by the scheduler 160. The scheduler 160 may be configured to assign the hardware engines 162a-162n to particular tasks in response to parsing the directed acyclic graphs stored in the DAG memory 168.

The circuit 164 may implement a shared memory circuit. The shared memory 164 may be configured to store data in response to input requests and/or present data in response to output requests (e.g., requests from the processor 150, the DRAM 154, the scheduler circuit 160 and/or the hardware engines 162a-162n). In an example, the shared memory circuit 164 may implement an on-chip memory for the computer vision processor 152. The shared memory 164 is generally operational to store all of or portions of the multidimensional arrays (or vectors) of input data elements and output data elements generated and/or utilized by the hardware engines 162a-162n. The input data elements may be transferred to the shared memory 164 from the DRAM circuit 154 via the memory bus 156. The output data elements may be sent from the shared memory 164 to the DRAM circuit 154 via the memory bus 156.

The path 166 may implement a transfer path internal to the processor 152. The transfer path 166 is generally operational to move data from the scheduler circuit 160 to the shared memory 164. The transfer path 166 may also be operational to move data from the shared memory 164 to the scheduler circuit 160.

The processor 150 is shown communicating with the computer vision processor 152. The processor 150 may be configured as a controller for the computer vision processor 152. In some embodiments, the processor 150 may be configured to transfer instructions to the scheduler 160. For example, the processor 150 may provide one or more directed acyclic graphs to the scheduler 160 via the DAG memory 168. The scheduler 160 may initialize and/or configure the hardware engines 162a-162n in response to parsing the directed acyclic graphs. In some embodiments, the processor 150 may receive status information from the scheduler 160. For example, the scheduler 160 may provide a status information and/or readiness of outputs from the hardware engines 162a-162n to the processor 150 to enable the processor 150 to determine one or more next instructions to execute and/or decisions to make. In some embodiments, the processor 150 may be configured to communicate with the shared memory 164 (e.g., directly or through the scheduler 160, which receives data from the shared memory 164 via the path 166). The processor 150 may be configured to retrieve information from the shared memory 164 to make decisions. The instructions performed by the processor 150 in response to information from the computer vision processor 152 may be varied according to the design criteria of a particular implementation.

Figure 4:
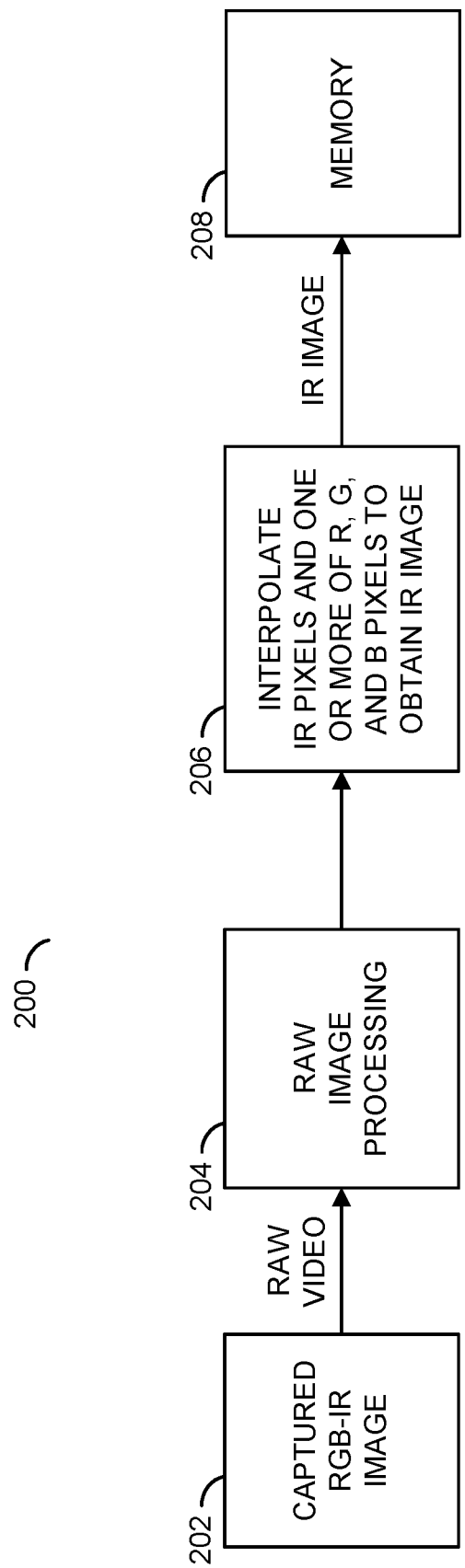
FIG. 4 is a diagram illustrating an example data flow utilizing a high resolution IR image in accordance with example embodiments of the invention.

Referring to FIG. 4, a diagram is shown illustrating an example data flow 200 utilizing a full resolution IR image in accordance with example embodiments of the invention. In an example embodiment, the data flow 200 may comprise a step (or state) 202, a step (or state) 204, a step (or state) 206, and a step (or state) 208. In the step 202, RGB-IR image data (e.g., red (R) samples, green (G) samples, blue (B) samples, and infrared (IR) samples) may be captured from an RGB-IR sensor. The RGB-IR image data may be transferred to the step 204 (e.g., as a raw image video signal RAW VIDEO). In the step 204, various raw image processing may be performed (e.g., noise reduction, black level subtraction, white balance, etc.). After the processing of the raw image data is complete, the processed image data may be transferred to the step 206.

In the step 206, an IR image may be generated by interpolating infrared information from all the pixel values obtained from the RGB-IR sensor. In general, the pixel values obtained from the RGB-IR sensor represent red, green, blue, and infrared (IR) pixels. A more precise definition is that each of the red, green, and blue elements of the RGB-IR sensor detect, respectively, red+IR, green+IR, and blue+IR, whereas the IR pixels detect only IR radiation. Thus, all pixels of the RGB-IR sensor 124 detect IR radiation, with the red, green and blue pixels also detecting red, green, and blue visible light. In an example, when a pixel detects red+IR, it means that the pixel value is equal to the sum of the red visible light and the IR radiation incident on the pixel element. Numerous techniques are known for extracting IR information from the red, green and blue pixel values. In an example, one or more of the existing techniques for extracting IR information may be utilized to perform interpolation utilizing infrared information from the infrared (IR) samples and one or more of the red (R) samples, the green (G) samples, and the blue (B) samples of each frame from the RGB-IR sensor 124 in generating an infrared (IR) image for each frame. In one example, the IR image may comprise a number of pixels greater than the number of IR samples in a frame received from the RGB-IR sensor 124. In another example, the IR image may comprise a pixel resolution matching the total number of samples (visible light and IR radiation) in a frame received from the RGB-IR sensor 124. In the step 208, the IR image generated in the step 206 may be stored in memory in preparation for subsequent utilization in artificial intelligence (AI) and/or computer vision (CV) applications.

Figure 5:
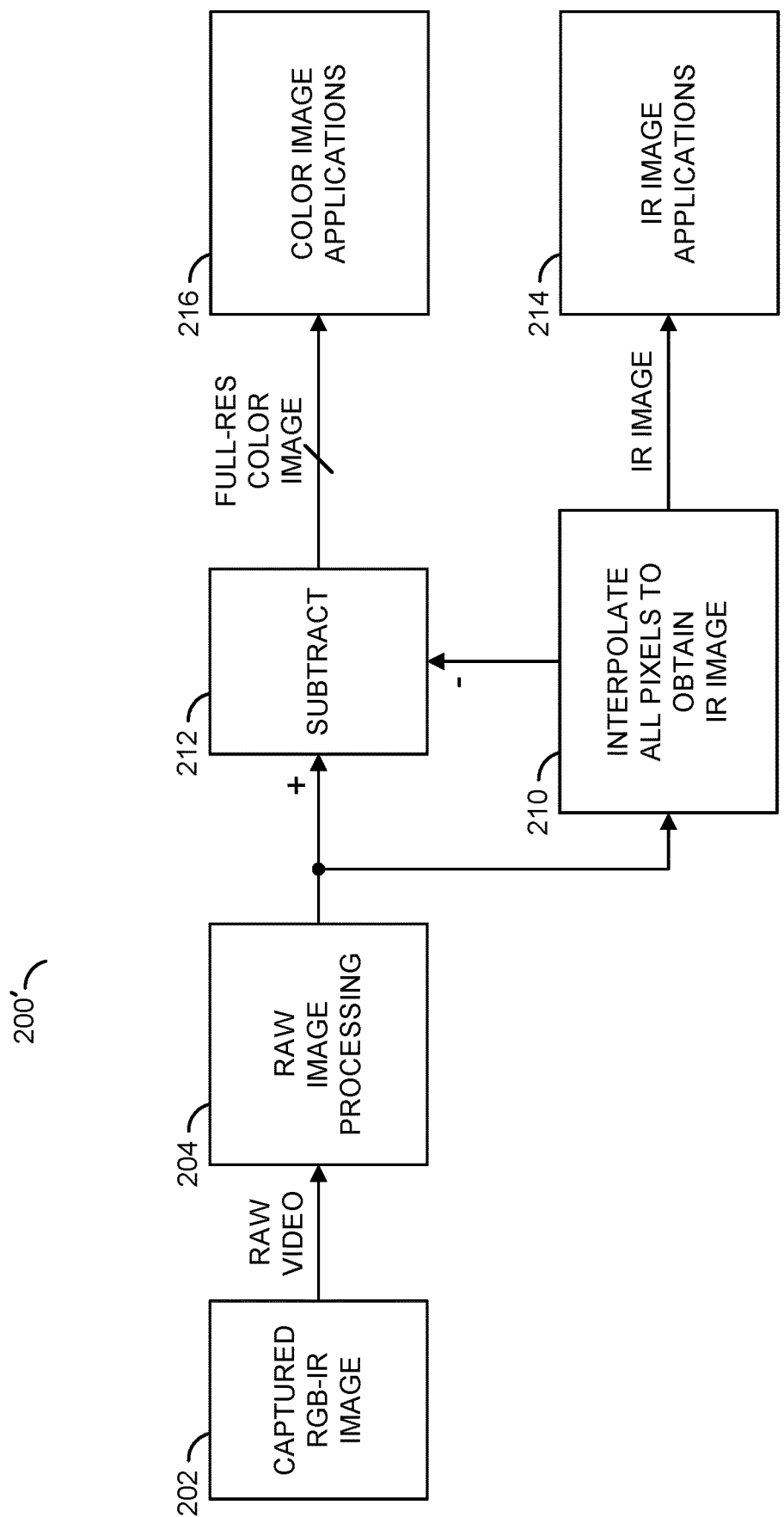
FIG. 5 is a diagram illustrating another example data flow utilizing a high resolution IR image in accordance with example embodiments of the invention.

Referring to FIG. 5, a diagram is shown illustrating another example data flow 200' utilizing an IR image in accordance with example embodiments of the invention. In an example embodiment, the data flow 200' may comprise the step (or state) 202, the step (or state) 204, a step (or state) 210, a step (or state) 212, a step (or state) 214, and a step (or state) 216. In the step 202, RGB-IR image data may be captured from the RGB-IR sensor 124. The RGB-IR image data may be transferred to the step 204 (e.g., as a raw image video signal). In the step 204, various raw image processing may be performed. After the processing of the raw image data is complete, the image data may be presented as an input of the step 210 and as a first input of the step 212. In the step 210, a full resolution IR image may be generated by interpolating all the infrared information extracted from the pixel values obtained from the RGB-IR sensor 124. The full resolution IR image data may be presented as a first output of the step 210 to a second input to the step 212, and as a second, separate output of the step 210 to an input to the step 214. In the step 212, the full resolution IR image data may be subtracted from the color+IR pixel data received from the step 204 and the pixel data interpolated using a visible light interpolation technique to generate full resolution color image data. The full resolution color image data may be presented as an input to the step 216. In the step 214, the full resolution IR image data may be utilization in artificial intelligence (AI) and/or computer vision (CV) applications. In the step 216, the full resolution color image data may be utilization in artificial intelligence (AI) and/or computer vision (CV) applications.

In various embodiments, a process may be implemented for outputting IR only (e.g., for applications where both IR and RGB signals are not needed) that may produce higher quality and higher resolution results than the conventional process of taking only the raw IR pixels and outputting a ½×½ sized IR picture. In various embodiments, computations used to interpolate IR pixels to full resolution for the purpose of subtracting off from the RGB pixels may also be used for outputting a full resolution IR picture. Even if a lower resolution (e.g., ½×½ sized) IR image is desired (e.g., to reduce the cost of subsequent processing, such as stereo depth detection or face detection), the above described methods in accordance with embodiments of the invention followed by conventional down-sampling is generally desirable. The reason is that conventional down-sampling will produce less aliasing than simply taking every other pixel from the RGB-IR sensor 124.

Figure 6:
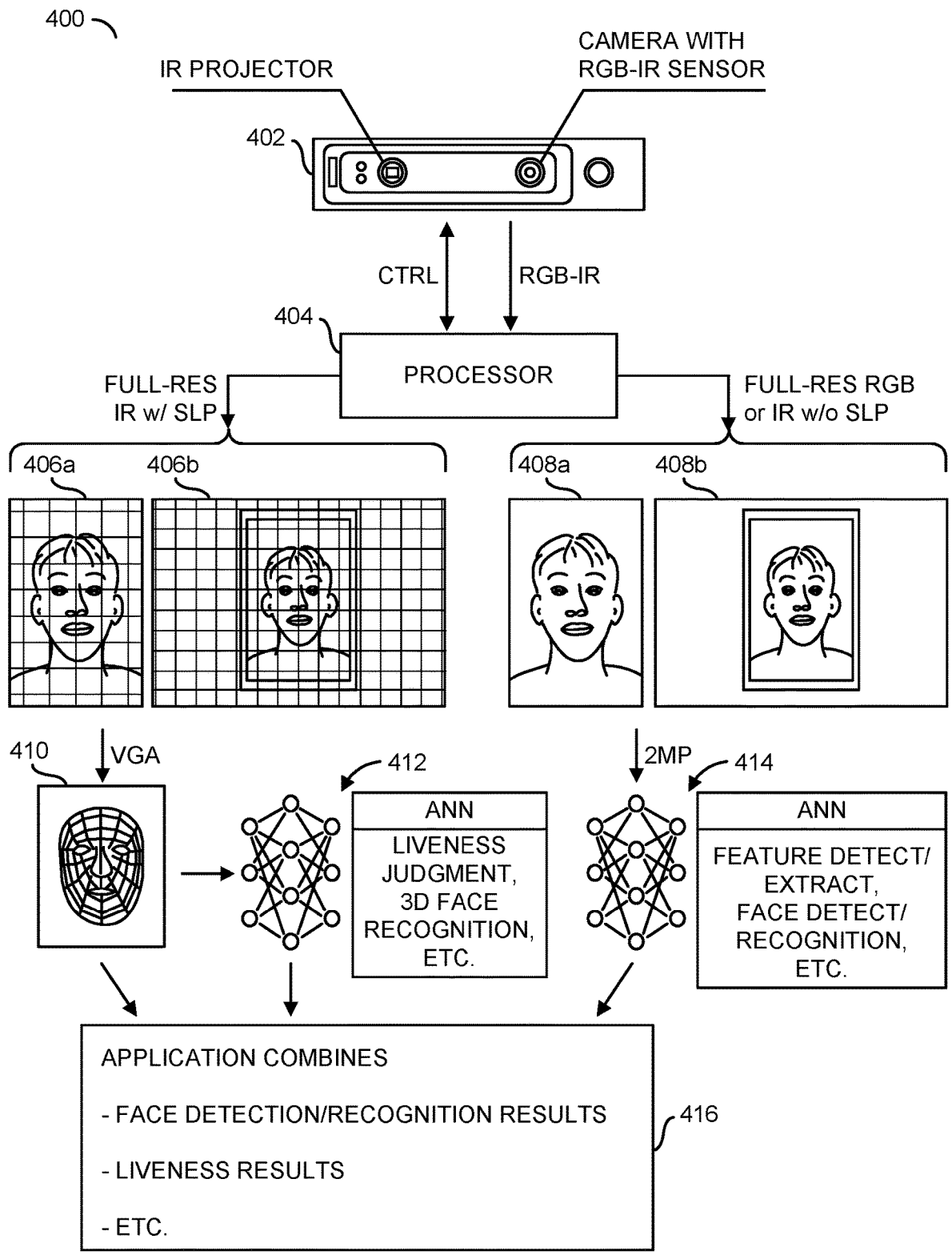
FIG. 6 is a diagram illustrating elements of a 3D sensing system utilizing high resolution IR images in accordance with an example embodiment of the invention.

Referring to FIG. 6, a diagram is shown illustrating elements of a 3D sensing system utilizing full resolution IR images in accordance with an example embodiment of the invention. In an example, a 3D sensing system 400 may include a housing 402 and a processor 404. The infrared (IR) structured light projector 112, including a first lens and the structured light source, and the capture device 104, including a second lens and the single RGB-IR image sensor, may be mounted in the housing 402. The IR structured light projector 112 may be configured, when turned on, to project a structured light pattern (SLP) on objects in the field of view of the capture device 104. The RGB-IR sensor of the circuit 124 may be used to acquire both IR image data (with and without the structured light pattern) and RGB image data (without the structured light pattern) for the objects in the field of view of the capture device 104. The 3D sensing system 400 generally provides advantages over conventional sensing systems. By utilizing full resolution IR image data with and without a structured light pattern (SLP), the 3D sensing system 400 generally improves the system performance.

In an example, the processor 404 may separate (split) the RGB-IR data from the RGB-IR sensor of the circuit 130 into a first image data channel comprising IR image data with the structured light pattern present and a second image data channel comprising RGB and/or IR image data without the structured light pattern present. In an example, the first and second image data channels may be processed by the processor 404 for 3D (e.g., depth) perception, liveness determination, 3D facial recognition, object detection, face detection, object identification, and facial recognition. In an example, the first image data channel having the IR image data with the structured light pattern present may be used to perform depth analysis, liveness determination, and/or 3D facial recognition. The second image data channel, having the IR image data without the structured light pattern present and the RGB image data without the structured light pattern present, may be used to generate an encoded (or compressed) video signal, bitstream, or multiple bitstreams, and to perform object detection, face detection, object identification, and/or facial recognition.

In an example, a depth analysis 410 may be applied to the first image data channel, which comprises the IR image data with the structured light pattern present (e.g., when the IR projector 112 is turned on). The depth analysis 410 may be utilized to generate depth information. In an example, the depth information generated by the depth analysis 410 may be utilized to discern between an image 406a of a 3D face of a real person (real face) and an image 406b of a picture of a person on paper, a computer screen, a phone screen, etc. (fake face). The generated depth information may also be used to make liveness determinations and/or to perform 3D facial recognition.

In an example, the depth information generated by the depth analysis 410 may be presented as inputs to a neural network 412. In another example, the depth information generated by the depth analysis 410 may be presented as inputs to traditional image processing and/or image analysis techniques. In an example, the neural network 412 may be configured (e.g., by design, through a training process, etc.) to perform liveness judgment (e.g., 3D Face/Fake Face) and/or 3D face recognition in real time. In an example, the neural network 412 may utilize the depth information generated by the depth analysis 410 to identify features of an object or a real person in the image 408a for 3D recognition and distinguish the image 408b of a picture of an object or a person on paper, a computer screen, a phone screen, etc. as a fake face or object. The neural network 412 may also utilize the depth information generated by the depth analysis 410 to make liveness determinations (judgments).

In an example, both the IR image data without the structured light pattern (e.g., the IR projector 112 is turned off) and the RGB image data without the structured light pattern present (e.g., the IR projector 112 is turned off), provided by the second image data channel, may be used to generate an encoded bitstream or bitstreams and to perform object detection, face detection, object identification, and facial recognition. In an example, the IR image data without the structured light pattern (e.g., the IR projector 112 is turned off) and/or the RGB image data without the structured light pattern (e.g., the IR projector 112 is turned off) may be presented as inputs to a neural network 414. In another example, the IR image data without the structured light pattern (e.g., the IR projector 112 is turned off) and/or the RGB image data without the structured light pattern (e.g., the IR projector 112 is turned off) may be presented as inputs to traditional image processing and/or image analysis techniques.

In an example, the neural network 414 may be configured (e.g., by design, through a training process, etc.) to obtain detection, recognition, and/or classification results in real time. In an example, in a low light (or night) environment the neural network 414 may utilize the IR image data (without the structured light pattern) from the second image data channel to identify features of an object or a person in a monochrome image 408a or monochrome image 408b of a picture of an object or a person on paper, a computer screen, a phone screen, etc. In brighter (daytime) environments, the neural network 414 may utilize the RGB image data (without the structured light pattern) from the second image data channel to render inferences based upon a color image 408a of a real object or person or a color image 408b of a photograph, image on a computer, cell phone screen, etc.

In embodiments implementing the neural network 412 and/or the neural network 414, the neural networks 412 and 414 may comprise one or more neural network architectures including, but not limited to, a convolutional neural network (CNN), a deep-learning neural network (DNN), and/or a fully connected neural network. Neural networks, more properly referred to as "artificial" neural networks (ANNs), are computing systems made up of a number of simple, highly interconnected processing elements, which process information by respective dynamic state responses to external inputs. Neural networks are processing devices (algorithms or actual hardware) that are loosely modeled after the neuronal structure of a brain, but on much smaller scales. A large neural network may have hundreds or thousands of processing units.

Neural networks are typically organized in layers. The layers may comprise a number of interconnected nodes that perform an operation or activation function. Input data is presented to an input layer of the network, which communicates to one or more internal (or hidden) layers where the actual processing is performed via an arrangement of weighted connections. The process of determining the weights for the weighted connections of the neural network is typically referred to as training. The hidden layers connect to an output layer where the result of a prediction model implemented by the neural network is presented.

In various embodiments, one or more applications 416 may utilize, alone or in combination, results of the depth analysis 410, outputs of the neural network 412, and/or outputs of the neural network 414. In an example, the application(s) 416 may be run on the processor 404 or using distributed processing (e.g., cloud resources, etc.).

Figure 7:
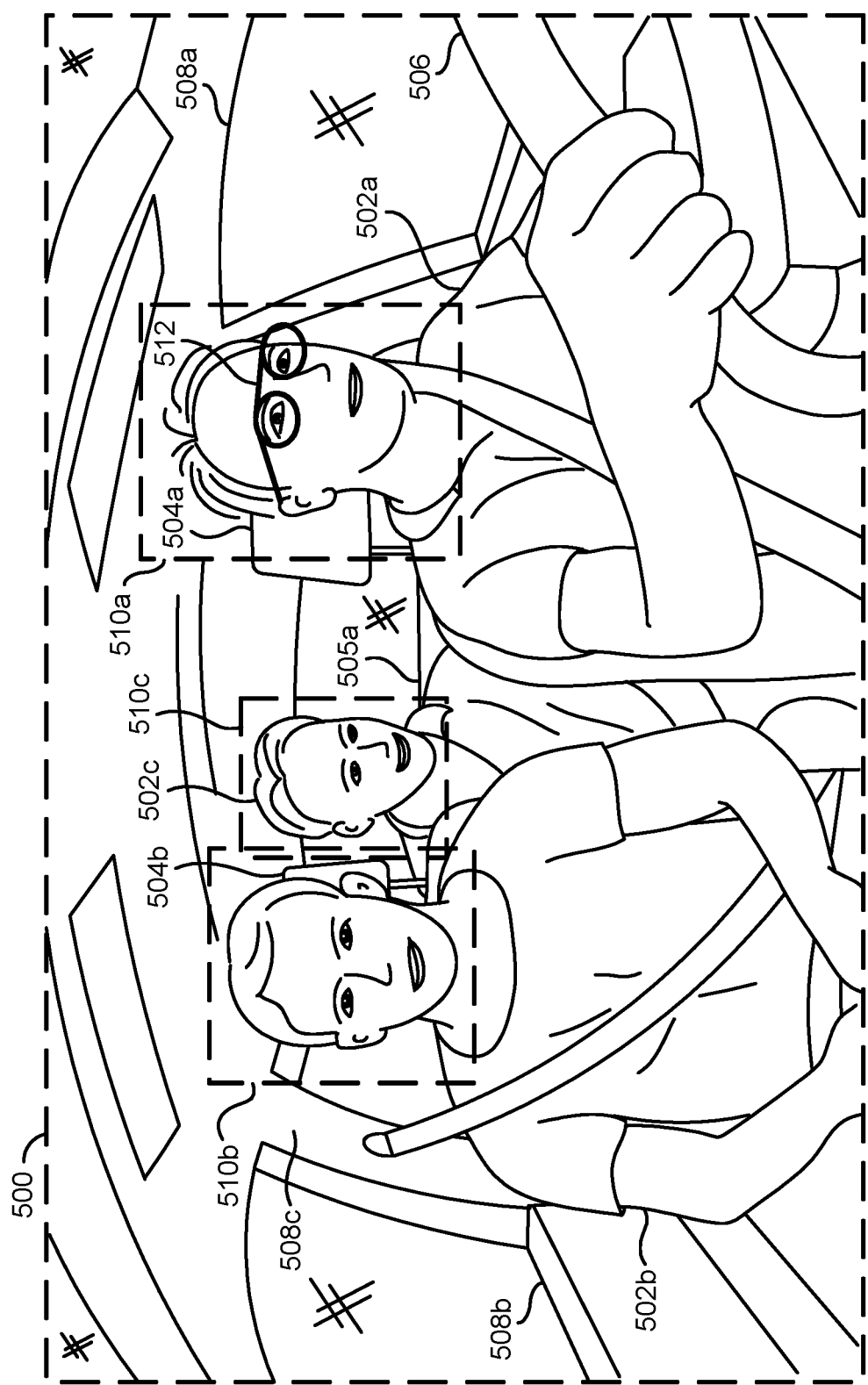
FIG. 7 is a diagram illustrating an example of using a processor to analyze a video frame for characteristics of a driver and occupants in a vehicle cabin.

Referring to FIG. 7, a video frame is shown illustrating using a processor to analyze an image for characteristics of a driver and/or occupants in a vehicle cabin. In an example, a video frame 500 illustrates an example image captured by the camera 100 configured as an occupant monitoring system. In an example, the camera 100 may be configured capture images of occupants 502a-502c within the cabin of the vehicle. In an example, the camera 100 may be implemented with an RGB-IR rolling shutter CMOS image sensor 124. The RGB-IR rolling shutter CMOS image sensor 124 of the camera 100 may generate the video frame 500 for analysis by the processor 102 as part of an occupant state monitoring system (OSMS) of the vehicle. In the example video frame 500, three occupants are shown. However, any number of occupants (e.g., 502a-502n) may be within the interior of the vehicle.

The video frame 500 may be a video frame captured by one or more of the instances of the camera 100 or the capture device 104 in the interior of the vehicle. In one example, the sensor 124 may be implemented with a wide angle lens configured to capture a wide angle field of view of the interior of the vehicle. For example, the processor 102 may be configured to perform video de-warping operations on potential distortions caused by the wide angle lens before performing the computer vision operations. In another example, the video frame 500 may be created by stitching together video frames captured at the same time by more than one instance of the camera 100 or the capture device 104. Capturing a wide angle view and/or generating a stitched view of the interior of the vehicle may enable the processor 102 to analyze a view showing more than one of the occupants 502a-502n of the vehicle. The method of capturing the wide angle video frame 500 may be varied according to the design criteria of a particular implementation.

In the example video frame 500, a number of occupants 502a-502c, a number of seats 504a-504b, a bench seat 505a, and/or a steering wheel 506 are shown. For example, a driver 502a is shown in a driver seat 504a, the passenger 502b is shown in a passenger seat 504b, and the occupant 502c is shown in a bench seat 505a in the back row of the vehicle. In an example, a convolutional neural network (CNN) module executed by the processor 102 may be configured to detect various objects in the video frame 500. In an example, computer vision operations may detect the steering wheel 506 (or other features of the interior of the vehicle). In another example, the computer vision operations may detect the driver seat 504a, the passenger seat 504b, and/or the back row bench seat 505a. In some embodiments, the processor 102 may determine whether the occupant 502a or 502b is the driver in response to the detected location of the steering wheel 506 (e.g., left side steering wheel or right side steering wheel).

Location references 508a-508n are shown in the interior of the vehicle. The location references 508a-508n may be objects detected by the CNN module that may be used as a reference point for determining a location within the vehicle. The location references 508a-508n may be generally static objects (e.g., objects that do not move, objects that only have a few positions, objects that move within a predefined range, etc.). The location reference 508a may be the driver side window (or door). The location reference 508b may be the passenger side door (or window). The location reference 508c may be a pillar of the vehicle (e.g., a part of the vehicle frame). Other objects may be used as the location references 508a-508n. In an example, the steering wheel 506 may be one of the location references 508a-508n. In another example, one or more of the seats 504a-504n may be one of the location references 508a-508n. The types of objects that may be used as the location references 508a-508n may be varied according to the design criteria of a particular implementation.

Dotted boxes 510a-510c are shown. The dotted boxes 510a-510c may represent a detected object and/or group of objects (e.g., detected by the CNN module). The objects 510a-510c may be detected by the video operations performed by the processor 102 used to detect objects in the video frame 500. In an example, feature descriptors may be extracted from the video frame 500 and the CNN module used to compare the extracted features to known features (e.g., features extracted from a training data set).

The objects 510a-510c detected by the processor 102 may be objects comprising faces, body parts and/or heads of the occupants 502a-502c. In the example shown, the objects 510a-510c may be faces of the occupants 502a-502c. However, the computer vision operations performed by the processor 102 may analyze and/or characterize any combination of body parts of the occupants 502a-502c (e.g., shoulders, chest, legs, etc.). In an example, the processor 102 may be configured to limit a search region of the video frame 500 to detect an object that is a subset of another object. In one example, the processor 102 may be configured to detect the faces 510a-510c in the video frame 500 first and then search the region of the video frame 500 that corresponds to the faces 510a-510c in order to detect identifying features (e.g., eyes, mouths, noses, etc. that would not be located in a region of the video frame 500 that is not one of the faces 510a-510c. Limiting the search region for an object that is a subset of another object may reduce the amount of processing resources needed to detect a particular object. The use of full resolution infrared and color images generally allows the processor 102 to more accurately detect features and/or detect smaller objects that are subsets of another object. In an example, the use of full resolution infrared images generally allows the processor 102 to more accurately detect and track the eyes of the driver 502a, even when the driver 502a is wearing sunglasses 512. For example, the sunglasses 512 generally appear transparent to infrared radiation.

The processor 102 may use the detected objects 510a-510c to locate the occupants 502a-502c within the vehicle cabin. For example, the face 510a may correspond to the occupant 502a, the face 510b may correspond to the occupant 502b and the face 510c may correspond to the occupant 502c. Other body parts may be detected in order to locate the occupants 502a-502c (e.g., chest, torso, arms, etc.).

In some embodiments, the processor 102 may determine the location of the occupants 502a-502c within the cabin of the vehicle by comparing the detected faces 510a-510c with the location references 508a-508n. For example, the processor 102 may be configured to store prior knowledge of the interior of the vehicle in a database (e.g., location coordinates of the window 508a with respect to the capture device 104 that captured the video frame 500, location coordinates of the door 508b with respect to the capture device 104 that captured the video frame 500, etc.). Based on the location of the detected faces 510a-510c with respect to the previously known location of the location references 508a-508n, the processor 102 may determine the location of each of the occupants 502a-502n within the cabin of the vehicle.

In an example, the processor 102 may be configured to detect the seats 504a-504b and/or the bench seat 505a and/or other objects of the interior of the vehicle. The processor 102 may be configured to associate a location of the occupants 502a-502c with the seats 504a-504b and/or the rear bench seat 505a. In an example, the processor 102 may detect the presence of the occupant 502b and that the location of the occupant 502b is in the front passenger seat 504b. In one example, the front passenger seat 504b may be one of the location references 508a-508n. In another example, the location of the passenger seat 504b may be associated with the location reference 508b (e.g., the passenger side door due to the proximity with the seat 504b).

In some embodiments, the processor 102 may be configured to determine a distance of the occupants 502a-502n by performing video-based measurements on the detected faces 510a-510n. In one example, 3D co-ordinates of the detected faces 510a-510c may be determined (e.g., by determining a horizontal co-ordinate, a vertical co-ordinate and/or a depth co-ordinate for each occupant 502a-502n with respect to the capture device 104). In another example, a sensor fusion module may be configured to analyze input from vehicle sensors to perform sensor fusion operations (e.g., cross-reference a location determined based on the computer vision operations with weight sensors located in the seats 504a-504b and/or the bench seat 505a, perform a comparison based on LIDAR, perform a comparison based on radar detection, etc.). In yet another example, the locations of various objects may be determined based on 3D positioning using a stereo pair of cameras (e.g., the video frame 500 may be one of a stereo pair of video frames captured by two instances of the capture devices 104 implemented as a stereo pair).

Locations may be further determined based on a monocular view (e.g., a monocular view may not provide an accurate result, but a high accuracy for location might not be necessary to a particular application). In some embodiments, the analysis performed by the processor 102 may be multi-functional. In the example shown, the processor may detect the faces 510a-510c in order to determine a location of the occupants 502a-502n. In some embodiments, the processor 102 may further use the results of detecting the faces 510a-510n in order to detect facial features (e.g., perform facial recognition) and/or determine an age of the occupants 502a-502c). In various embodiments, the generation of full resolution infrared images and color images by the processor 102 generally facilitates improved detection of facial features and/or improves performance of facial recognition techniques by the processor 102. In some embodiments, the processor 102 may be configured to detect other characteristics of the detected faces 510a-510c and/or other body parts of the occupants 502a-502c (e.g., a body size, body proportions, a body orientation, etc.). In various embodiments, the processor 102 may utilize the location of the occupants 502a-502c to strategically deploy air bags, provide notifications/warnings, adjust door locks, etc. The use of the results of the computer vision operations performed by the processor 102 using the full resolution infrared images and/or color images may be varied according to the design criteria of a particular implementation.

Figure 8:
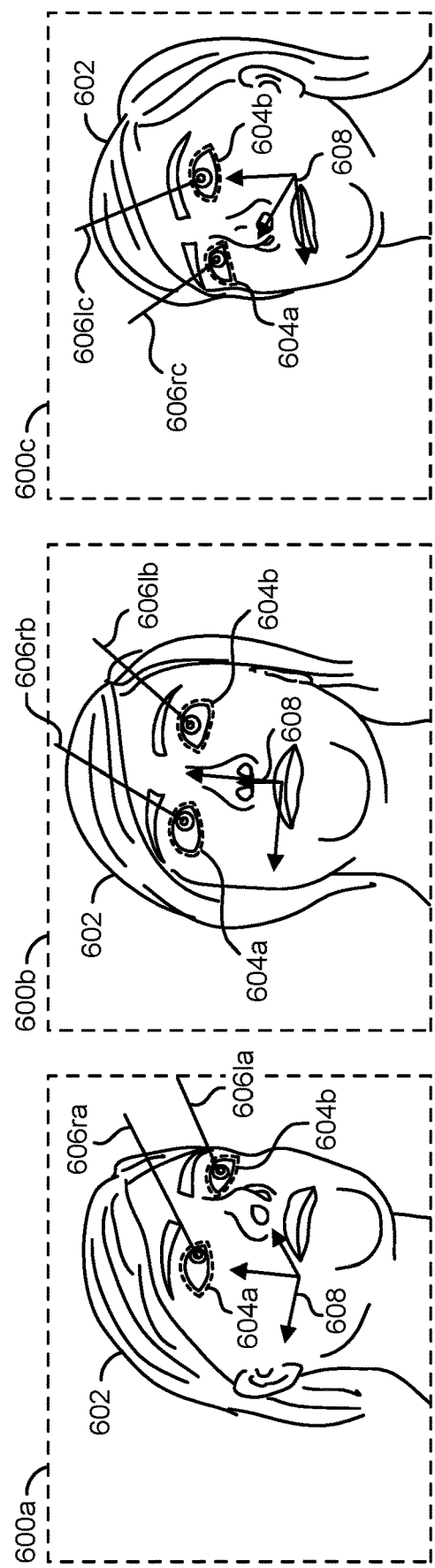
FIG. 8 is a diagram illustrating an example of using video frames for tracking a gaze of a driver.

Referring to FIG. 8, a diagram illustrating tracking a gaze of the driver is shown. In an example, the camera 100 may be configured as part of a driver monitoring system (DMS) of a vehicle. In an example, a number of video frames 600a-600c may be used to represent video frames of a driver 602 captured by the camera 100 as part of the driver monitoring system (DMS) of the vehicle. In an example, the sensor 124 of the capture device 104 may be implemented with an RGB-IR CMOS image sensor. The RGB-IR CMOS image sensor 124 may generate the video frames 600a-600c for analysis by a driver state monitoring system (DSMS) of the vehicle. In an example, the video frames 600a-600c may be a sequence of video frames (e.g., the video frame 600a may be captured first, then the video frame 600b, and then the video frame 600c). In another example, the video frames 600a-600c may be multiple video frames capturing the driver 602 simultaneously (e.g., the video frames 600a-600c may have the same time stamp). In the example, three capture devices may each capture a different angle of the driver 602 at the same time and the resulting video frames 600a-600c may be presented to the driver state monitoring system of the vehicle for analysis. In an example, the driver state monitoring system may be configured to generate notifications/warnings to the driver when predetermined signs of fatigue are detected based on the analysis of the video frames 600a-600c. In an example, a warning may be generated based on predetermined criteria (e.g., a value exceeding a predefined threshold, etc.) related to said signs of fatigue. In an example, the analysis may be performed and the warnings may be generated using existing (known) driver monitoring techniques.

In an example, a view of the head and face of the driver 602 is shown in each of the video frames 600a-600c. Dotted lines 604a-604b are shown around the eyes of the driver. In one example, the processor 102, when implemented as part of a driver state monitoring system of the vehicle, may be configured to detect the location of the eyes of the driver 602. The dotted lines 604a-604b may represent the eyes of the driver 602 that have been detected by the processor 102. In an example, full resolution infrared images generated by the processor 102 may be used to more accurately detect the eyes of the driver 602 even when the driver is wearing sunglasses. For example, sunglasses generally appear transparent to infrared radiation.

Lines 606ra-606rc and lines 606la-606lc are shown. The lines 606ra-606rc are shown extending from the right eye 604a of the driver 602 in each of the video frames 600a-600c. The lines 606la-606lc are shown extending from the left eye 604b of the driver 602 in each of the video frames 600a-600c. The lines 606ra-606rc may represent the direction that the right eye 604a is pointed. The lines 606la-606lc may represent the direction that the left eye is pointed.

An axis 608 is shown in each of the video frames 600a-600c. The axis 608 may be a reference (e.g., not actually visible in the captured image). The axis 608 may be illustrated to indicate the direction that the driver 602 is facing. The axis 608 may be used by the driver state monitoring system of the vehicle as a location reference for determining a location of the eyes 604a and 604b and/or the direction of the gaze in three dimensions.

Figure 9:
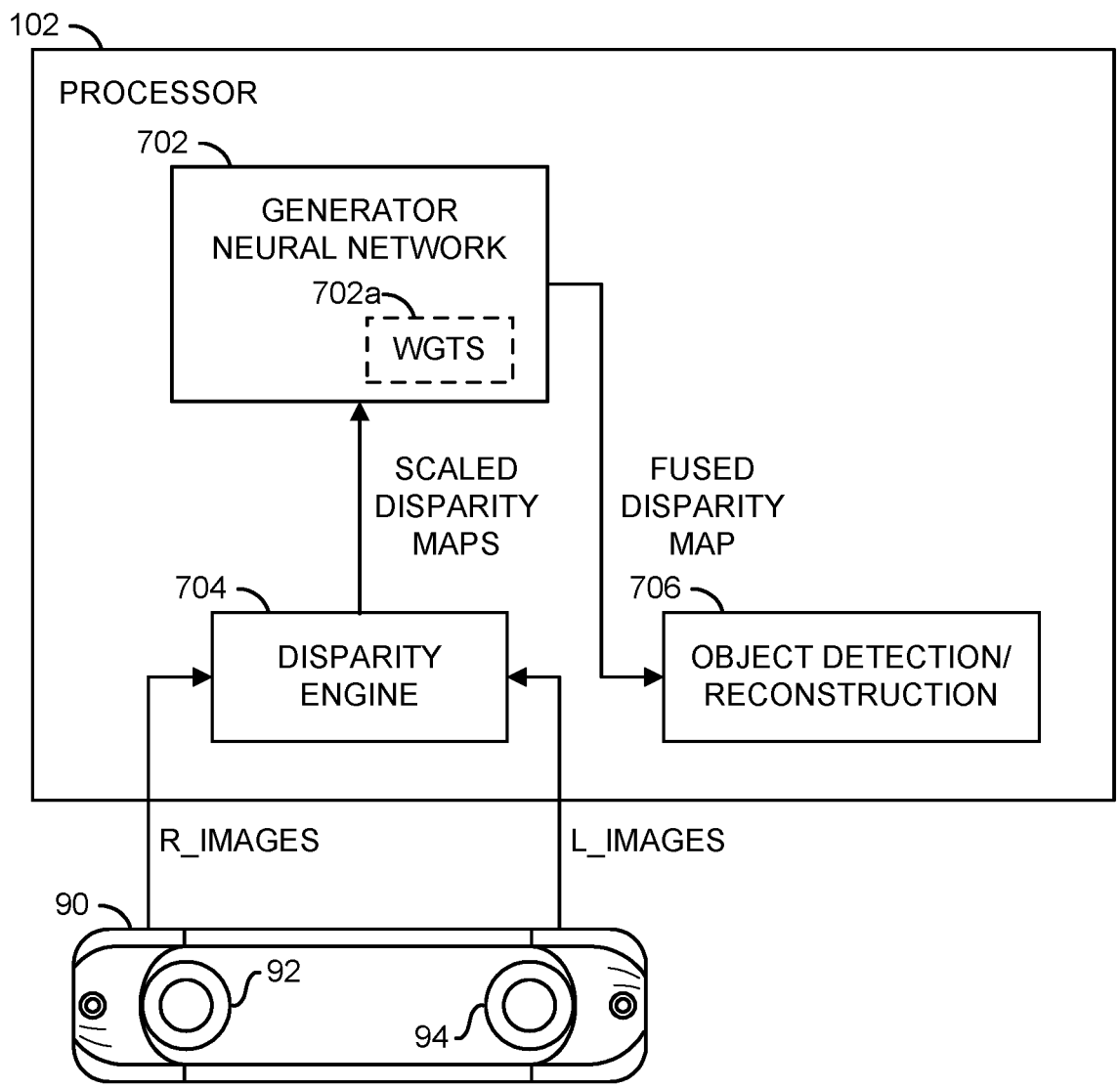
FIG. 9 is a diagram illustrating a processor in accordance with an example embodiment of the invention in a context of a stereo camera application.

Referring to FIG. 9, a diagram is shown illustrating the processor 102 in accordance with an example embodiment of the invention in a context of a stereo camera application. In an example, the processor 102 may be configured to received images from a camera assembly 90. In an example, the processor 102 may receive a first signal (e.g., R_IMAGES) and a second signal (e.g., L_IMAGES) from the camera assembly 90. The signal R_IMAGES may communicate a first subset of images from the camera assembly 90 to the processor 102. The signal L_IMAGES may communicate a second subset of images from the camera assembly 90 to the processor 102. In an example where the camera 90 is configured as a stereo camera, the signals R_IMAGES and L_IMAGES may comprise corresponding right and left images, respectively, captured by the camera assembly 90.

In an example, the camera assembly 90 may comprise a first camera 92 and a second camera 94. In an example embodiment, the first camera 92 may comprise a first RGB-IR image sensor and a first lens and the second camera 94 may comprise a second RGB-IR image sensor and a second lens. In an example embodiment, the first camera 92 and the second camera 94 may be configured as a stereo camera pair. For example, the first camera 92 and the second camera 94 may be mounted such that an optical axis of the first camera 92 and an optical axis of the second camera 94 are aligned at a predetermined angle to each another.

In various embodiments, the processor 102 may be configured to generate full resolution infrared images and/or color images using image pixel data communicated by the signal R_IMAGES and the signal L_IMAGES. The processor 102 may be further configured to calculate disparity values between corresponding images formed from the signal R_IMAGES and the signal L_IMAGES. In an example, the disparity values may be utilized for object detection and/or reconstruction. In another example, the disparity values may be utilized for object tracking, depth measurement, object speed and/or motion determination, etc. In general, disparity comprises depth information that may be utilized in any application needing three-dimensional (3D) information (e.g., 3D reconstruction).

In an example embodiment, the processor 102 may comprise a block (or circuit) 702, a block (or circuit) 704, and a block (or circuit) 706. The block 702 may be implemented using one or more artificial neural networks (ANNs). In an example embodiment, the block 702 may be implemented using convolutional neural networks (CNNs) or deep convolutional neural networks (DCNNs). In an example, the neural networks of the block 702 may be implemented using a directed acyclic graph (DAG) and a corresponding set of weights 702a. In an example embodiment, the DAGs may be executed using hardware engines of the processor 102. In an example, the corresponding set of weights 702a may be determined using an unsupervised training process.

In an example embodiment, the circuit 704 may be implemented as a disparity engine. The circuit 704 may be implemented using any hardware, software, and/or combination of hardware and software that calculates disparity, including, but not limited to, conventional disparity calculating circuitry. In an example, hardware implementations of the circuit 704 may include, but are not limited to, field programmable gate arrays (FPGAs) and application specific integrated circuits (ASICs). In an example embodiment, the circuit 706 may be implemented as an object detection/reconstruction circuit. The circuit 706 may be implemented using any hardware, software, and/or combination of hardware and software that detects and/or reconstructs objects within images, including, but not limited to, conventional techniques for detecting and/or reconstructing objects. In an example, hardware implementations of the circuit 706 may include, but are not limited to, field programmable gate arrays (FPGAs) and application specific integrated circuits (ASICs).

In an example embodiment, the block 702 may be implemented as a generative neural network model. In various embodiments, the block 702 may be utilized during both training and inference (deployment) phases of the processor 102. In an example, the block 702 may be paired with a discriminator neural network during the training phase. In various embodiments, the block 702 may have an input that may receive a number of scaled disparity maps (e.g., a disparity map for each scale of a disparity map pyramid) and an output that may present a fused disparity map. The fused disparity map may be generated by the block 702 from the number of scaled disparity maps based on the weights 702a.

In an example embodiment, the circuit 704 may have a first input that may receive the signal R_IMAGES, a second input that may receive the signal L_IMAGES, and an output that may communicate the number of scaled disparity maps to the block 702. The output of the block 702 may be coupled to an input of the circuit 706. In an example embodiment, the signals R_IMAGES and L_IMAGES may be communicated to the circuit 704 using one or more memories or buffers (not shown). In another example, the signals R_IMAGES and L_IMAGES may also be communicated to the block 702 to further improve the fused disparity values generated by the block 702.

Figure 10:
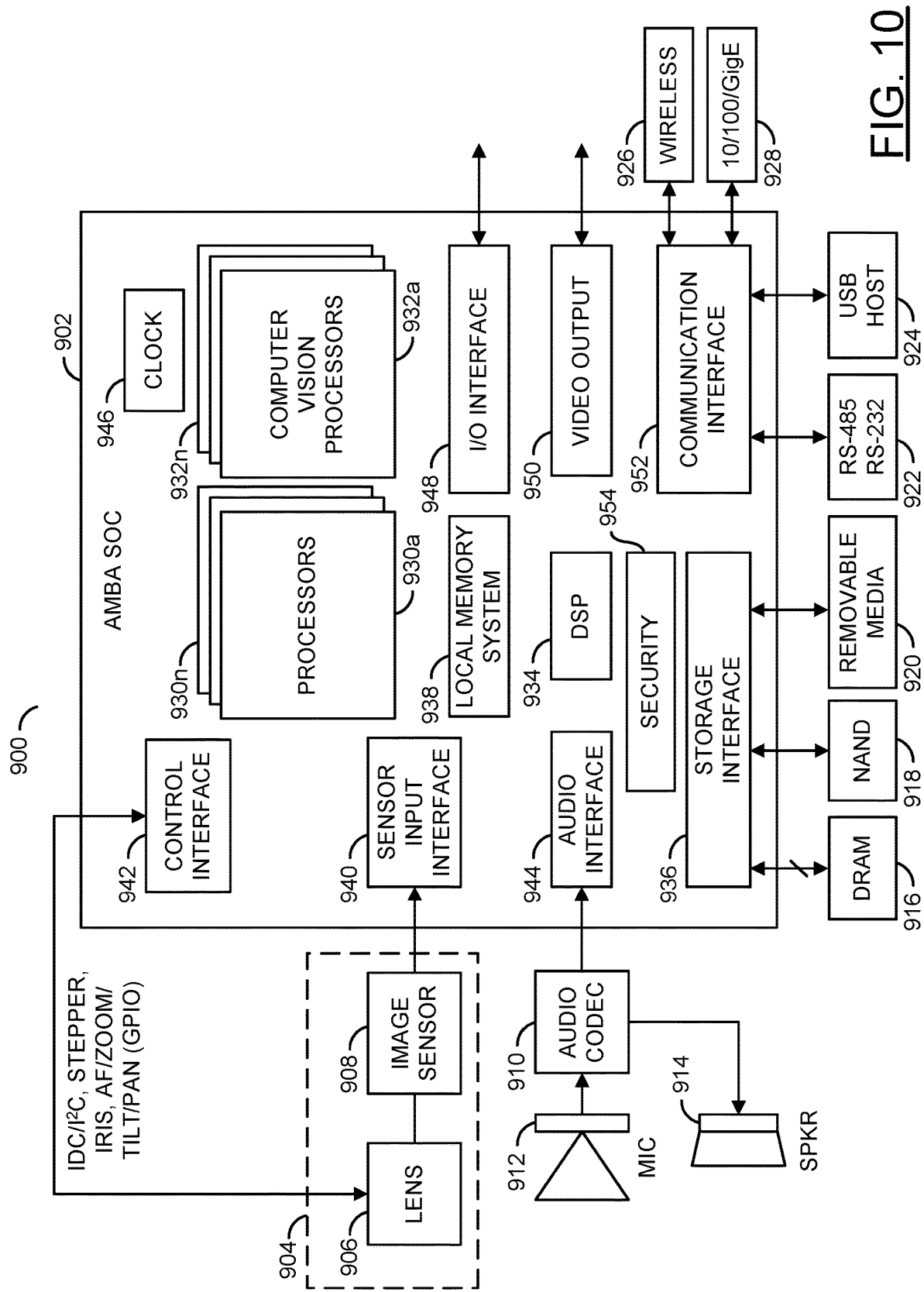
FIG. 10 is a diagram illustrating an example implementation of a computer vision system in which a process of high resolution infrared image generation using image data from an RGB-IR sensor and visible light interpolation in accordance with example embodiments of the invention may be utilized.

Referring to FIG. 10, a diagram of a camera system 900 is shown illustrating an example implementation of a computer vision system in accordance with example embodiments of the invention in which a process of full resolution infrared image generation using image data from an RGB-IR sensor with or without visible light interpolation may be utilized. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the circuits and processes described above in connection with FIG. 1 through FIG. 9.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be an image sensor. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near the camera system 900. The lens assembly 906 may capture and/or focus light for the image sensor 908. The lens assembly 906 may implement an optical lens. The lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera system 900.

The image sensor 908 may receive light from the lens assembly 906. The image sensor 908 may be configured to transform the received focused light into digital data (e.g., bitstreams). In some embodiments, the image sensor 908 may perform an analog to digital conversion. For example, the image sensor 908 may perform a photoelectric conversion of the focused light received from the lens assembly 906. The image sensor 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) a memory 916, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, a wireless communication device 926, and an Ethernet interface 928.

In various embodiments, the processor/camera circuit 902 may comprise a number of blocks (or circuits) 930a-930n, a number of blocks (or circuits) 932a-932n, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, a block (or circuit) 952, and/or a block (or circuit) 954. The number of circuits 930a-930n may be processor circuits. In various embodiments, the circuits 930a-930n may include one or more embedded processors (e.g., ARM, etc.). The circuits 932a-932n may implement a number of computer vision related processor circuits. In an example, one or more of the circuits 932a-932n may implement various computer vision related applications. The circuit 934 may be a digital signal processing (DSP) module. In some embodiments, the circuit 934 may implement separate image DSP and video DSP modules.

The circuit 936 may be a storage interface. The circuit 936 may interface the processor/camera circuit 902 with the DRAM 916, the non-volatile memory 918, and the removable media 920. One or more of the DRAM 916, the non-volatile memory 918 and/or the removable media 920 may store computer readable instructions. The computer readable instructions may be read and executed by the processors 930a-930n. In response to the computer readable instructions, the processors 930a-930n may be operational to operate as controllers for the processors 932a-932n. For example, the resources of the processors 932a-932n may be configured to efficiently perform various specific operations in hardware and the processors 930a-930n may be configured to make decisions about how to handle input/output to/from the various resources of the processors 932.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. In an example, the DAG memory 168 may be implemented in the local memory system 938. The circuit 940 may implement a sensor input (or interface). The circuit 942 may implement one or more control interfaces including but not limited to an inter device communication (IDC) interface, an inter integrated circuit (I2C) interface, a serial peripheral interface (SPI), and a pulse width modulation (PWM) interface. The circuit 944 may implement an audio interface (e.g., an I2S interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuit 954 may be a security module. The circuits 930 through 954 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 916, the NAND 918, etc.). When executed by one or more of the processors 930, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 916, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 930 and/or one or more of the processors 932. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound (I2S) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee®, USB, Wi-Fi, UART, etc.). In one example, the communication module 952 may implement a secure digital input output (SDIO) interface. The communication module 952 may include support for wireless communication by one or more wireless protocols such as Bluetooth®, ZigBee®, Z-Wave, LoRa, Institute of Electrical and Electronics Engineering (IEEE) 102.11a/b/g/n/ac (WiFi), IEEE 102.15, IEEE 102.15.1, IEEE 102.15.2, IEEE 102.15.3, IEEE 102.15.4, IEEE 102.15.5, and/or IEEE 102.20, GSM, CDMA, GPRS, UMTS, CDMA2000, 3GPP LTE, 4G/HSPA/WiMAX, 5G, LTE M, NB-IoT, SMS, etc. The communication module 952 may also include support for communication using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The security module 954 may include a suite of advanced security features to implement advanced on-device physical security, including OTP, secure boot, TrustZone®, and I/O visualization, and DRAM scrambling. In an example, the circuit 954 may be used for DRAM communication encryption on the processor/camera circuit 902.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, ZigBee®, Z-Wave, LoRa, Wi-Fi IEEE 102.11a/b/g/n/ac, IEEE 102.15, IEEE 102.15.1, IEEE 102.15.2, IEEE 102.15.3, IEEE 102.15.4, IEEE 102.15.5, IEEE 102.20, GSM, CDMA, GPRS, UMTS, CDMA2000, 3GPP LTE, 4G/HSPA/WiMAX, 5G, SMS, LTE M, NB-IoT, etc. The processor/camera circuit 902 may also include support for communication using one or more of the universal serial bus protocols (e.g., USB 1.0, 2.0, 3.0, etc.).

The functions performed by and structures illustrated in the diagrams of FIGS. 1 to 10 may be designed, modeled, emulated, and/or simulated using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP), distributed computer resources, and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a memory configured to store one or more frames of image pixel data, each frame comprising red (R) samples, green (G) samples, blue (B) samples, and infrared (IR) samples obtained from an RGB-IR sensor; and
a processor circuit configured to generate an infrared image for each frame, wherein (i) said infrared image for each frame has a number of infrared (IR) pixels greater than the number of said infrared (IR) samples of each frame, (ii) said processor circuit is configured to extract infrared information from said red (R) samples, said green (G) samples, and said blue (B) samples of each frame from said RGB-IR sensor, (iii) said processor circuit performs interpolation utilizing said infrared (IR) samples and said infrared information extracted from one or more of said red (R) samples, said green (G) samples, and said blue (B) samples of each frame from said RGB-IR sensor in generating said infrared image for each frame, and (iv) said processor circuit comprises a plurality of dedicated hardware engines configured to perform operations for execution of artificial neural networks configured to perform one or more of depth determination and liveness judgment utilizing the infrared image frames having the number of infrared (IR) pixels greater than the number of infrared (IR) samples obtained from the RGB-IR sensor.

2. The apparatus according to claim 1, wherein said infrared image for each frame has a pixel resolution matching a total number of samples of each frame.

3. The apparatus according to claim 1, wherein said processor circuit is further configured to generate a full-resolution color image for each frame and said processor circuit performs interpolation utilizing said red (R) samples, said green (G) samples, said blue (B) samples, and said infrared (IR) samples in generating said full-resolution color image.

4. The apparatus according to claim 3, wherein said processor circuit further comprises an output interface configured to output said infrared image frames having the number of infrared (IR) pixels greater than the number of infrared (IR) samples obtained from the RGB-IR sensor and said full-resolution color image frames to additional processing circuitry.

5. The apparatus according to claim 1, wherein said processor circuit further comprises a storage interface configured to output said infrared image to said memory.

6. The apparatus according to claim 1, wherein said plurality of dedicated hardware engines are configured to further perform operations for execution of artificial neural networks configured to perform one or more of 3D face recognition, feature detection and extraction, object detection and classification, face detection, and facial recognition.

7. The apparatus according to claim 1, further comprising a first camera comprising a first RGB-IR sensor and a first lens, wherein said processor circuit is further configured to capture said one or more frames of image pixel data from said first camera and store said one or more frames of image pixel data in said memory.

8. The apparatus according to claim 7, further comprising a second camera comprising a second RGB-IR sensor and a second lens, wherein said processor circuit is further configured to capture said one or more frames of image pixel data from said first camera and said second camera, and store said one or more frames of image pixel data in said memory.

9. The apparatus according to claim 8, wherein said processor circuit is further configured to:
compute disparity values using infrared images having the number of infrared (IR) pixels greater than the number of infrared (IR) samples obtained from the RGB-IR sensor generated from said image pixel data from said first camera and said second camera; and
determine depth information for one or more objects based on said disparity values.

10. The apparatus according to claim 1, further comprising a structured infrared light projector coupled to said processor circuit, wherein said processor circuit is further configured to (i) control said structured infrared light projector to project a structured light pattern and (ii) determine depth information for one or more objects based on said structured light pattern in said infrared image for each frame.

11. The apparatus according to claim 1, wherein said processor circuit is further configured to detect signs of fatigue in a driver of a vehicle based on said infrared image for each frame and generate a warning based on predetermined criteria related to said signs of fatigue.

12. A method of generating infrared (IR), red (R), green (G), and blue (B) images from an RGB-IR sensor, said method comprising the steps of:
reading red (R) samples, green (G) samples, blue (B) samples, and infrared (IR) samples from a memory configured to store one or more frames of image pixel data, wherein each frame comprises said red (R) samples, said green (G) samples, said blue (B) samples, and said infrared (IR) samples obtained from said RGB-IR sensor;
extracting, using a processor circuit, infrared information from said red (R) samples, said green (G) samples, and said blue (B) samples of each frame from said RGB-IR sensor; and
generating, using said processor circuit, an infrared image for each frame, wherein (i) said infrared image for each frame has a number of infrared (IR) pixels greater than the number of said infrared (IR) samples of each frame, (ii) said processor circuit performs interpolation utilizing said infrared (IR) samples and infrared information extracted from one or more of said red (R) samples, said green (G) samples, and said blue (B) samples of each frame from said RGB-IR sensor in generating said infrared image for each frame, and (iii) said processor circuit comprises a plurality of dedicated hardware engines configured to perform operations for execution of artificial neural networks configured to perform one or more of depth determination and liveness judgment utilizing the infrared image frames having the number of infrared (IR) pixels greater than the number of infrared (IR) samples obtained from the RGB-IR sensor.

13. The method according to claim 12, wherein said infrared image for each frame has a pixel resolution matching a total number of samples of each frame.

14. The method according to claim 12, further comprising:
generating, using said processor circuit, a full-resolution color image for each frame, wherein said processor circuit performs interpolation utilizing said red (R) samples, said green (G) samples, said blue (B) samples, and said infrared (IR) samples in generating said full-resolution color image.

15. The method according to claim 14, further comprising:
outputting, using an output interface circuit, said infrared image frames having the number of infrared (IR) pixels greater than the number of infrared (IR) samples obtained from the RGB-IR sensor and said full-resolution color images to additional processing circuitry within said processor circuit.

16. The method according to claim 12, further comprising:
outputting, using a storage interface circuit, said infrared image frames having the number of infrared (IR) pixels greater than the number of infrared (IR) samples obtained from the RGB-IR sensor to said memory.

17. The method according to claim 12, further comprising:
executing, using said plurality of dedicated hardware engines of said processor circuit, one or more direct acyclic graphs defining one or more artificial neural networks configured to perform one or more of 3D face recognition, feature detection and extraction, object detection and classification, face detection, and facial recognition.

18. The method according to claim 12, further comprising:
capturing a first portion of said one or more frames of image pixel data using a first camera comprising a first RGB-IR sensor and a first lens, and storing said first portion of said one or more frames of image pixel data in said memory;
capturing a second portion of said one or more frames of image pixel data using a second camera comprising a second RGB-IR sensor and a second lens, and storing said second portion of said one or more frames of image pixel data in said memory;
computing disparity values using infrared images having the number of infrared (IR) pixels greater than the number of infrared (IR) samples obtained from the RGB-IR sensor generated from said image pixel data from said first camera and said second camera; and
determining depth information for one or more objects based on said disparity values.

19. The method according to claim 12, further comprising:
controlling a structured infrared light projector using said processor circuit to project a structured light pattern; and
determining depth information, using said processor circuit, for one or more objects based on said structured light pattern in said infrared image for each frame having the number of infrared (IR) pixels greater than the number of infrared (IR) samples obtained from the RGB-IR sensor.

20. The method according to claim 12, further comprising:
detecting signs of fatigue in a driver of a vehicle based on said infrared image for each frame having the number of infrared (IR) pixels greater than the number of infrared (IR) samples obtained from the RGB-IR sensor; and
generating a warning based on predetermined criteria related to said signs of fatigue.

* * * * *